United States Patent
Eedarapalli

(10) Patent No.: US 11,842,229 B2
(45) Date of Patent: Dec. 12, 2023

(54) SYSTEM AND METHOD FOR DESIGNING AND DEVELOPING APPLICATION PROGRAMMING INTERFACE

(71) Applicant: Prama, Inc., Louisville, KY (US)

(72) Inventor: Srinivasa Raju Eedarapalli, Louisville, KY (US)

(73) Assignee: Prama, Inc., Louisville, KY (US)

( * ) Notice: Subject to any disclaimer, the term of this patent is extended or adjusted under 35 U.S.C. 154(b) by 184 days.

(21) Appl. No.: 17/569,543

(22) Filed: Jan. 6, 2022

(65) Prior Publication Data

US 2022/0342727 A1 Oct. 27, 2022

Related U.S. Application Data

(60) Provisional application No. 63/134,185, filed on Jan. 6, 2021.

(51) Int. Cl.
G06F 9/54 (2006.01)
G06F 9/451 (2018.01)
G06F 16/242 (2019.01)

(52) U.S. Cl.
CPC .............. *G06F 9/543* (2013.01); *G06F 9/451* (2018.02); *G06F 16/2428* (2019.01)

(58) Field of Classification Search
None
See application file for complete search history.

(56) References Cited

U.S. PATENT DOCUMENTS

| | | | | |
|---|---|---|---|---|
| 6,985,722 | B1 * | 1/2006 | Snelgrove | H04M 7/0081 370/255 |
| 7,644,100 | B2 * | 1/2010 | Chang | G06Q 10/06 707/999.102 |
| 10,664,535 | B1 * | 5/2020 | Hahn | G06F 16/9535 |
| 10,887,262 | B1 * | 1/2021 | Bilotti | H04L 51/52 |
| 2004/0022259 | A1 * | 2/2004 | Tuchow | H04L 69/18 370/401 |
| 2014/0324892 | A1 * | 10/2014 | Tong | G06F 16/9535 707/754 |
| 2018/0191596 | A1 * | 7/2018 | Bhaya | G10L 15/26 |
| 2019/0095532 | A1 * | 3/2019 | Levine | G06F 21/6218 |
| 2020/0301920 | A1 * | 9/2020 | Bleigh | G06F 16/22 |
| 2021/0065121 | A1 * | 3/2021 | Brehmer | G06Q 10/107 |

* cited by examiner

*Primary Examiner* — Toan H Vu

(57) ABSTRACT

Embodiments of the present disclosure provide a system and a method for designing and developing an Application Programming Interface (API). The method includes receiving selection of one or more data objects of a relational structure corresponding to an API from a user through a User Interface (UI), and generating a selected response data structure comprising each of the one or more data objects. The method further include receiving a selection of one or more data object filters corresponding to the selection of the one or more data objects, from the user via the UI, and receiving a user request for the API, via the UI, corresponding to the data object of the one or more data objects. The method further include displaying API response data based on the user request, via the UI.

20 Claims, 20 Drawing Sheets

FIG. 13

| Components | ↙ | APIs Responses | + ▽ ↙ | GetPatientDemogrphics | Test Response Definition | Save As | Save |
|---|---|---|---|---|---|---|---|
| View Flex Layouts | | GetPatientDemographics | | Selected Response Tree | | Pick Properties To Read Patient | |
| View Grid Layouts | | PatienNeedsHRTTest | | Self | | ☑ First Name | |
| Themes | | PatientHarmoneTests | | ├─Gets──Patient⁺ | | ☑ Last Name 🔒 | |
| Cards | | Diagnoses | | ├─Gets──MSSScreening | | ☐ SSN 🔒 | |
| Perspectives | | RMRTestResult | | ├─HasPrimary──FitnessAssessment⁺ | | ☐ DOB 🔒 | |
| APIs | | AwsConnectIntegration | | ├──────Phone | | | |
| APIs: Responses | | HarmoneTest | | └─IsPartOf──GoalContext | | | |
| Domain Model | | PatientHarmoneTestViaGoalContext | | | | | |
| Build Solution | | GetConditionTypes | | | | | |
| Content Providers | | PatientHarmoneTeststemp | | | | | |
| Domain Data | | PatientHarmoneTest2 | | | | | |
| Note Categories | | PatientHRTTestResults | | | | | |
| | | GetClinicalAreaConditionTypes | | | | | |
| | | GetConditionTypeSingTypes | | | | | |
| | | GetConditionTypesSymptomTypes | | | | | |
| | | ... | | | | | |

1018

410

| Components | ↙ | APIs | + ▽ ↙ | GetPatientInformationForPatientInAGivenState | Save AS ↙ |
|---|---|---|---|---|---|
| Process Types | | AvailableTask | | Create/Update Service API Data Definition | |
| | | MyTaskPending | | API Name | |
| Flow Types | | GetPatientDemographicalForPati... | | GetPatientInformationForPatientInAGivenState | |
| Interaction Types | | MyTaskComplete | | | |
| Expert Types | | GetRMRTestResult | | API Source | |
| View Flex Layouts | | GetPatientNeedsHRTTest | | ▽ Please Select api Source | |
| View Grid Layouts | | GetHarmoneTest | | | |
| Themes | | GetDiagnoses | | | |
| Cards | | GetPatientWithID | | | |
| Perspectives | | GetPatientHarmoneTestFromGoal... | | | |
| | | AwsConnectIntegration | | | |
| APIs | | GetPatientHarmoneTest | | | |
| APIs Responses | | GetHarmoneTestsForMen | | | |
| Domain Model | | GetPatientDiagnoses | | | |
| Build Solution | | GetHarmoneTestForWomen | | | |
| | | ... | | | |

1020 (top right), 1022 (pointing to API Name field)

FIG. 14

| Domain Model | GetPatientHarmoneTestFromGoal... | Pick Request To Filter On |
|---|---|---|
| Build Solution | AwsConnectIntegration | Self — Patient ←1028 |
| | GetPatientHarmoneTest | ServedBy — Physician |
| Content Providers | GetHarmoneTestsForMen | LivesIn — State |
| Domain Data | GetPatientDiagnoses | Underwent — Evaluation |
| Note Categories | GetHarmoneTestForWomen | Gets — MSScreening |
| | | Gets — FitnessAssessment |
| Access Control | .... | Needs — PT |
| | | Has — Diagnoses |

1032

Resquest Tree
Filter Criteria: Basic | Advanced

```
Self
├─ ServedBy          □ Patient   ←1030
└─ LivesIn             Physician⁺
                       State⁺
```

Basic Filter
Physician : Entity

Field Name — 1038    Operator — 1040    Value Source
[Licence ID]          [Equals]           [Variable]

(+) Add Another Condition

1034

```
Self
├─ ServedBy          □ Patient
└─ LivesIn⁺            Physician⁺
                       State⁺
```

Basic Filter
State : Entity
                                    ←1040
Field Name    Operator    Value Source    Value
[Code ▽]      [Equals ▽]  [Constant ▽]    [KY]

(+) Add Another Condition

1036

```
Self
├─ ServedBy          □ Patient
└─ LivesIn+            Physician⁺
                       State⁺
```

Basic Filter
LivesIn : Relationship
                    1038
Field Name    Operator    Value Source
[Since ▽]     [Less Than ▽] [Variable ▽]

(+) Add Another Condition

SYSTEM AND METHOD FOR DESIGNING AND DEVELOPING APPLICATION PROGRAMMING INTERFACE

TECHNICAL FIELD

This disclosure relates generally to application programming interfaces (APIs), and more particularly to a method and a system for designing, developing and defining data objects for APIs.

BACKGROUND

Application programming interfaces (APIs) are a set of definitions and protocols for building and integrating application software. They let multiple software components in an application software communicate with each other, by defining the types of calls or requests that can be made, in particular types of formats in which they can be made, what queries or protocols to be used to make the requests or the calls. Most of the APIs are implemented in calling of data from a data model or a database which requires reading or accessing of the data from the database. Many APIs are also designed for writing of data into a database.

A large percentage of APIs developed as part of any application revolve around accessing (READ) of the data the data store. Most of these APIs are designed and developed to read a subset of connected entities in a domain model. A lot of developer effort may be spent in coding for these APIs from scratch which typically involves writing queries, reading data, mapping the retrieved data to response structures, testing and deploying them. Any time a change is needed, it may involve a lot of refactoring of code and re-testing effort.

As the API's input criteria gets complex, a lot of effort may be spent in tuning the queries for performance as well.

Also, currently APIs are designed and developed by developing software coding for these APIs which involves manually writing queries. This process may involve a lot of time and energy of the developers.

Thus, there may exist a need in the current systems for designing and developing of APIs which may require lesser time, lesser efforts and skills, and saving costs.

OBJECTIVES AND SUMMARY OF THE INVENTION

In an embodiment, a method for designing and developing Application Programming Interface (API) is disclosed. In one example, the method may include receiving selection of one or more data objects of a relational structure corresponding to an API from a user through a User Interface (UI). The relational structure may include a plurality of selectable data objects. The method may further include generating a selected response data structure comprising each of the one or more data objects. The method may further include receiving a selection of one or more data object filters corresponding to the selection of the one or more data objects, from the user via the UI. Each of the one or more data object filters may correspond to one of an API request or an API response. Each of the one or more data object filters ay include at least one selectable filtering condition associated with a data object of the one or more data objects. The method may further include receiving a user request for the API, via the UI, corresponding to the data object of the one or more data objects. The user request may include at least one data object filter from the one or more data object filters. The method may further include displaying API response data based on the user request, via the UI. The API response data may correspond to the data object in accordance with the at least one data object filter.

In another embodiment, a system for designing and developing API is disclosed. In one example, the system includes a processor and a computer-readable medium communicatively coupled to the processor. The computer-readable medium store processor-executable instructions, which, on execution, cause the processor to receive selection of one or more data objects of a relational structure corresponding to an API from a user through a User Interface (UI). The relational structure may include a plurality of selectable data objects. The processor-executable instructions, on execution, may further cause the processor to generate a selected response data structure comprising each of the one or more data objects, and receive a selection of one or more data object filters corresponding to the selection of the one or more data objects, from the user via the UI. Each of the one or more data object filters may correspond to one of an API request or an API response. Each of the one or more data object filters ay include at least one selectable filtering condition associated with a data object of the one or more data objects. The processor-executable instructions, on execution, may further cause the processor to receive a user request for the API, via the UI, corresponding to the data object of the one or more data objects. The user request may include at least one data object filter from the one or more data object filters. The processor-executable instructions, on execution, may further cause the processor to display API response data based on the user request, via the UI. The API response data may correspond to the data object in accordance with the at least one data object filter.

In one embodiment, a non-transitory computer-readable medium storing computer-executable instructions for designing and developing API is disclosed. In one example, the stored instructions, when executed by a processor, cause the processor to perform operations including receiving selection of one or more data objects of a relational structure corresponding to an API from a user through a User Interface (UI). The relational structure may include a plurality of selectable data objects. The operations may further include generating a selected response data structure comprising each of the one or more data objects. The operations may further include receiving a selection of one or more data object filters corresponding to the selection of the one or more data objects, from the user via the UI. Each of the one or more data object filters may correspond to one of an API request or an API response. Each of the one or more data object filters ay include at least one selectable filtering condition associated with a data object of the one or more data objects. The operations may further include receiving a user request for the API, via the UI, corresponding to the data object of the one or more data objects. The user request may include at least one data object filter from the one or more data object filters. The operations may further include displaying API response data based on the user request, via the UI. The API response data may correspond to the data object in accordance with the at least one data object filter.

It is an objective of the present invention to provide a quicker and an easier system and method to design and develop an API response by providing a representation of the database, via a UI, for a user or a developer to quickly and easily choose any data entity from the database which is to be included in the API response.

It is an objective of the present invention to easily design and develop an API response by starting from choosing any data entity in a database, such as a Graph-based Database, and further move to choose any related or connected data entities via relationships.

It is an objective of the present invention to easily design, develop and test an API response by providing a visual interactive UI, which may be implemented by a developer or a user to create, design and develop API response visually.

It is an objective of the present invention to easily design and develop an API response by easily selecting any required data entities and relationships, that are needed in the response of the API, from a tree-like or a graph-like representation of the database, via an interactive UI.

It is an objective of the present invention to also provide an ability to pick any number of needed attributes of each data entity/relationship.

It is an objective of the present invention to provide an ability to define basic API request filters through an interactive UI, such as a graphical interface. Further, an ability to add advanced filters using Cypher/Query Fragments may also be provided in the present invention. Furthermore, an ability to add filters and sort on the response elements, through Cypher/Query Fragments may also be provided in the present invention.

It is an objective of the present invention to easily test the API responses as well as APIs against sample domain data and/or actual data.

It is also an objective of the present invention to provide the test responses in JSON and Tree View Formats.

An additional objective of the present invention is to self-tune API's data access paths by parsing through the filters criteria and sorting functions used in API definitions, collating them, intelligently identifying the minimal set of indexes that are needed across all the API and automatically creating them, so, the API data access automatically is tuned to make the APIs highly performant.

An additional objective of the present invention to highlight any APIs that need manual tuning by identifying resource utilization increases from the logs.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 13 illustrates interactive visual UI for selecting attributes and selecting secured attributes of a data object in an API Response, in accordance with some embodiments of the present disclosure.

FIGS. 14-17 illustrate interactive visual UIs for defining, designing and modelling APIs (API Requests), in accordance with some embodiments of the present disclosure.

DETAILED DESCRIPTION

Figure 1:
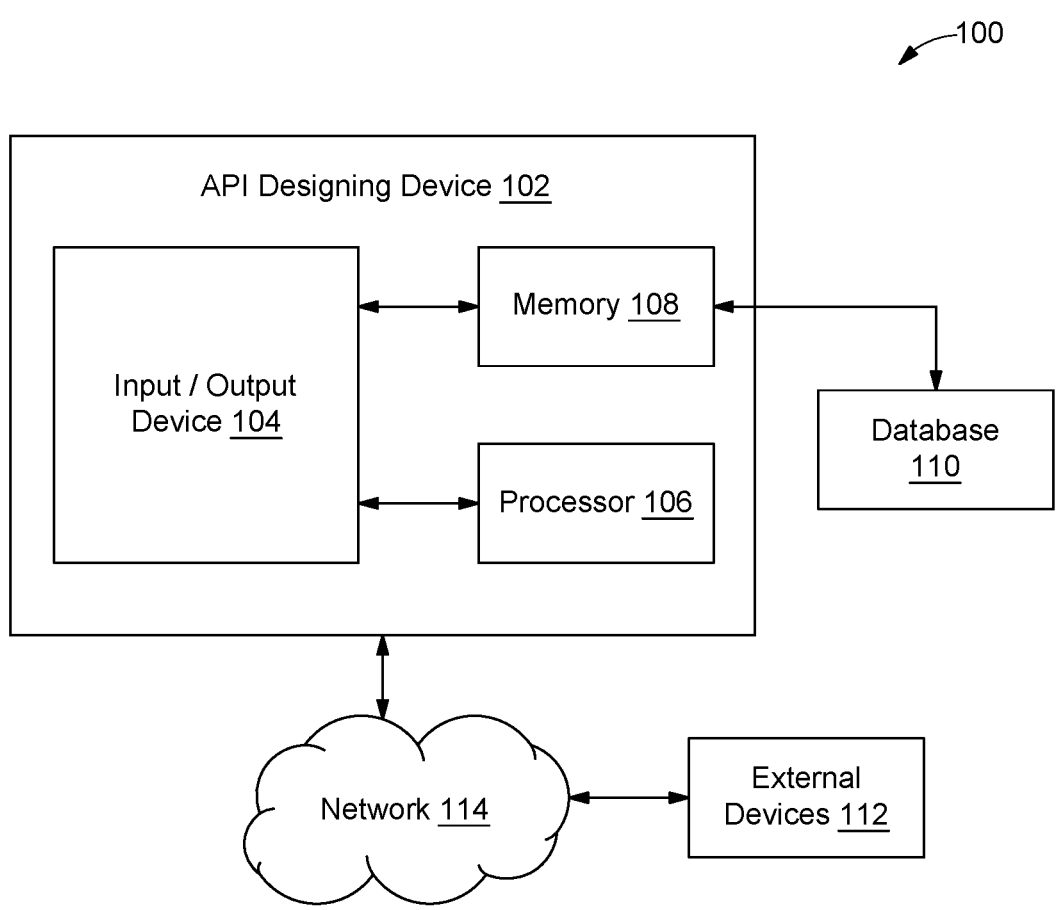
FIG. 1 is a block diagram of a system for defining and designing APIs (API requests and API responses), in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The present disclosure provides a system and a related method for designing Application Programming Interfaces (APIs). More particularly, the present system may provide an interactive visual User Interface (UI) that may be implemented to easily define one or more data objects for configuring, designing and developing definitions of APIs (API Request and API Responses). The data objects may include and is not limited to, data entities, relationships between the data entities, and the attribute information related to both of them, where the data entities are the data objects represented in a relational data model for a relational database.

The visual UI may be implemented in the present system to visualize a relational structure of the data objects that may show and define the data objects as they are related in the relational data model. The visual relational structure may be a hierarchical relational structure, such as tree-like structure or a graph relational structure. It may be apparent to a person skilled in the art that the relational structure may be embodied in another form, other than tree-like structure or a graph relational structure, to depict data objects and their relations as they are contained and related in the relational data model, without deviating from the meaning and scope of the present disclosure.

The visual UI may be interactively used by a user, such as an API developer, to easily view the hierarchical relational structure and simply select required data objects and their relationships, along with the attribute information of both the data objects and the relationships, in order to include them in configuring and designing the APIs (including API requests and API responses).

Also, the visual UI may be used by the user to define and configure filters that are to be applied on the data objects and the relationships, when the APIs generally read data from a database. Thus, the UI may also help in defining filters for configuring and designing the APIs (API requests and API responses). As the visual UI may be used to simply select the required data objects and their relationships for defining APIs, similarly the visual UI may also be used to simply select the data objects and their relationships for which the filters need to be defined, and further to define those filters or filtering conditions for the selected the data objects. The UI may be used to easily view and select the filtering conditions by navigating through one or more filter menus, where the filter menus define a number of filtering conditions for data objects and their relationships. In an embodiment, the filter menus may be embodied in the form of drop-down menus. It may be apparent to a person skilled in the art that the filter menus may be presented at the UI in other forms, such as a fill-in tab, a search tab, dialogue box, including others for showing the filtering conditions associated with a data object or a data relationship, without deviating from the meaning and scope of the present disclosure.

Therefore, the present system may provide the visual UI for simply selecting and defining required data objects and their relationships, along with the attribute information related to both of them, and further for selecting and defining one or more filtering conditions for required data objects and their relationships, along with the attribute information related to both of them, in order to configure a structured definition for an API (API requests and API responses) for the API to read and fetch adequate data result set from a database accordingly.

Additionally, the present system may also provide the visual UI for easily selecting and defining one or more sorting conditions to sort the data result set which is read by the API. The visual UI may provide one or more sorting menus which may be used to easily view and select the sorting conditions, where the sorting menus define a number of sorting conditions for the data objects and their relationships. In an embodiment, the sorting menus may be embodied in the form of drop-down menus. It may be apparent to a person skilled in the art that the sorting menus may be presented at the UI in other forms, such as a fill-in tab, a search tab, dialogue box, including others for showing the sorting conditions associated with a data object or a data relationship, without deviating from the meaning and scope of the present disclosure Referring to FIG. 1 which illustrates a system 100 for configuring and designing a structured definition of APIs (API requests and API responses), in accordance with some embodiments of the present disclosure. In an embodiment, the system defines the APIs for a relational data model may be supporting a relational database. The relational data model may illustrate/represent a relationship model that may include multiple data relationships between multiple data entities.

The system 100 may include a API designing device 102 with processing capabilities for defining, designing and modelling a structure of an API. Modelling may mean manipulating a structure of an API by adding, deleting, updating or changing any attribute of the structure of an API, such as by adding or deleting data entities which are to be included in the definition of an API. Examples of the API designing device 102 may include, but are not limited to a server, a desktop, a laptop, a notebook, a net book, a tablet, a smartphone, or a mobile phone. The API designing device 102 may include an input/output (I/O) device 104 that may be responsible for capturing information and data, for processing, and in turn displaying a processed output. The input/output device 104 may include, but is not limited to, a keyboard, a touch screen, a mouse, a microphone, a scanner, a joystick, a monitor, a digital display screen, and a printer.

The API designing device 102 may further include a processor 106, which may be communicatively coupled to a memory 108. The memory 108 may store processor instructions, which when executed by the processor 106 may cause the processor 106 to define and model the structures or definitions of the APIs. This is further explained, in detail in conjunction with FIG. 2. The memory 108 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to, Dynamic Random-Access Memory (DRAM), and Static Random-Access memory (SRAM).

Moreover, the API designing device 102 may be communicatively coupled to a database 110 for storing information related, including but not limited to, one or more users of the software system/application and/or of a business domain or a business organization, one or more information related to business processes in the business organization or information related to the business organization. The database 110 may further include information related to the relationship data model for relational database. It may be apparent to a person skilled in the art that the database 110 may include any type of information required by the present system 100 and the API designing device 102, without deviating from the meaning and scope of the present disclosure.

The database 110 may be updated periodically with a new set of parameters corresponding to the information stored in it. Additionally, the API designing device 102 may be communicatively coupled to an external device 112 via network 114 for sending and receiving various data. Examples of the external device 112 may include, but is not limited to, a remote server, digital devices, mobile device, mobile computing devices and a computer system.

Figure 2:
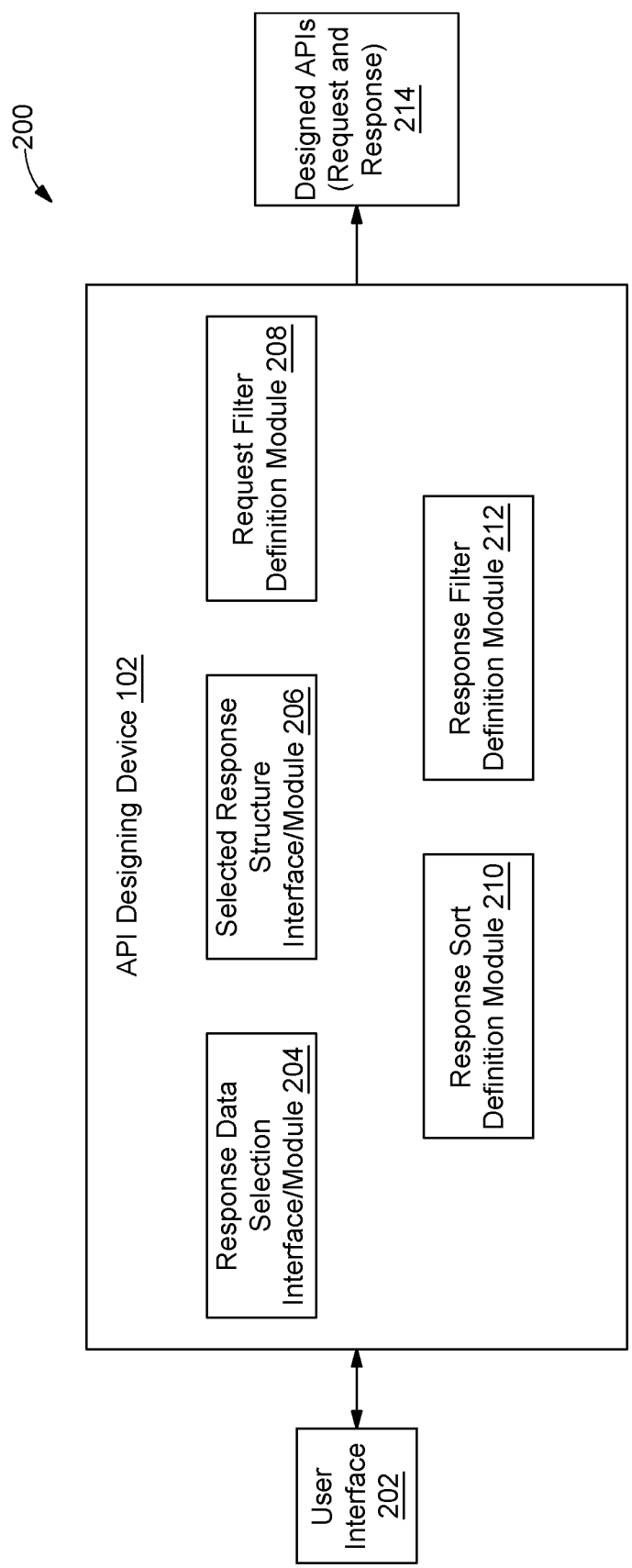
FIG. 2 is a functional block diagram of a system for defining, designing and modelling APIs (API requests and API responses), in accordance with an embodiment of the present disclosure.

FIG. 2 illustrates a block diagram of a system 200 for designing and modelling a defined structured of APIs (API requests and API responses), in accordance with some embodiments of the present disclosure. The system 200 may include and illustrate one or more components or modules included in the API designing device 102 that may function together for defining, designing and modelling structures of APIs. A user, such as an API developer, may interact or access functionalities of the modules of the API designing device 102 via a user interface (UI) 202. The API designing device 102 may include a response data selection module 204, a selected response structure module 206, a request filter definition module 208, a response sort definition module 210, and a response filter definition module 212 that may function together for defining, designing and modelling APIs. It may be apparent to a person skilled in the art that the API designing device 102 may include one or more modules, other than the modules 204-212, such as a data reading module for reading data set, a test module for testing samples of APIs, etc., that may help in defining, designing, and modelling APIs, without deviating from the meaning and scope of the present disclosure.

The present system 100 (and 200) may be implemented for designing definitions of APIs to support relational data model and to read data from a relational database. The UI 202 may present to the user a relational structure showing a number of data objects. The data objects may include and are not limited to data entities, relationships between the data entities, and attribute information related to both of them, individually or in combination, where the data entities are the data objects represented in a relational data model supporting a relational database. The relational structure may be a hierarchical relational structure, such as tree-like structure or a graph relational structure. The user may view the relational structure in order to view the data objects and their relationships, as they are defined and related in the relational data model. The data objects, as depicted in the relational structure via the UI 202, may be selectable by the user, using the input device 104. Also, the user may deselect the selected data objects using the input device 104. Thus, such selections/deselections of the data objects, via the UI 202, may include or delete the data objects into and from a structured definition of the API, respectively, as defined using the present system. Therefore, the API designing device 102 may allow the user to define and configure a structured definition of the API, via the visual UI 202, by simply selecting/deselecting the data objects.

For configuring a definition of the APIs, one or more data objects may need to be defined and configured for configuring API responses and also, API requests. A user may select, via the UI 202, one or more data objects, including the data entities, the data relationships and the attribute information contained in both of them, from the selectable relational structure of the data objects, as depicted to the user via the UI 202. For selecting the data objects, the API designing device 102 may implement its response data selection module 204, to enable the user to make the selections of the data objects which are to be defined for configuring the API responses. Further, as and when the selections are being made, the API designing device 102 may implement its selected response structure module 206 to simultaneously create a selected response data structure that may include all the selected data objects. The selected response data structure may be embodied in the same form, such as a tree-like structure, as of the selectable relational structure from which the selections of the data objects are being made. The user may view the selected response data structure via the UI 202.

Further, for designing and configuring the definition of the APIs, data object filters for designing the API request and API responses need to be configured as well. The data object filters may include basic level filtering conditions and advance level filtering conditions, individually or in combination, that should be applied on one or more of the selected data objects. The data object filters may define filtering conditions for the data objects, and these filters may also need to be defined and configured for the API request and API responses, in order to define a structured definition for the APIs.

To implement the above for defining and configuring the data object filters, the API designing device 102 may execute its request filter definition module 208 and the response filter definition module 212, individually or in combination. The data object filters may be presented to the user via the UI 202, in form of one or more data object filter menus. The data object filter menus may define and present one or more filtering conditions associated with a particular data object, and these filtering conditions are selectable by the user via the UI 202. Thus, the user may select, via the UI 202, one or more data objects from the selected response data structure for which filtering conditions need to be defined. After this, the user may select, via the UI 202, one or more filtering conditions, associated with a particular selected data object, from the data object filter menus.

As and when the selections of the data object filters are made, the API designing device 102 may implement its request filter definition module 208 and/or the response filter definition module 212 depending on whether the filters are being defined for the API response or an API request. Thus, a user is enabled to make the selections of the data object filters which are to be defined for configuring the API responses and the API requests. The user may view the selected data object filters via the UI 202.

In an embodiment, the present system may apply an AND logic operation on the selected data object filters, by default, for the designed APIs 214 to filter and read a required data result set. In another embodiment, the present system may apply an OR logic operation on the selected data object filters, by default, for the designed APIs 214 to filter and read a required data result set. In another embodiment, the present system may apply an AND logic operation in combination with OR logic operation on the selected data object filters, by default, for the designed APIs 214 to filter and read a required data result set. It may be apparent to a person skilled in the art that the present system may apply other logic operations to filter the read a required data result set, without deviating from the meaning and scope of the present disclosure.

Furthermore, in an embodiment, it may also be required by the designed APIs 214, while reading and fetching a filtered data result set, to sort the filtered data result set in a sorting order, and show the sorted data result set to the user. Thus, the present system may also present to the user, via the UI 202, one or more data object sorting conditions may define sorting conditions for the data objects and these sorting conditions may need to be applied on the filtered data result set. The sorting conditions may also need to be defined and configured for the API responses that would be read and returned as a result of an API request.

To implement the above for defining and configuring the sorting conditions, the creation device may execute its response sort definition module 210. The data object sorting conditions may be presented to the user via the UI 202, in form of one or more data object sorting menus. The data object sorting menus may define and present one or more sorting conditions associated with a particular data object, and these sorting conditions are selectable by the user via the UI 202. Thus, the user may select, via the UI 202, one or more data objects from the selected response data structure for which sorting conditions need to be defined. After this, the user may select, via the UI 202, one or more sorting conditions, associated with a particular selected data object, from the data object sorting menus.

As and when the selections of the data object sorting conditions are made, the API designing device 102 may implement its response sort definition module 210. Thus, a user is enabled to make the selections of the data object sorting conditions which are to be defined for configuring the API responses. The user may view the selected data object sorting conditions via the UI 202.

Figure 3A:
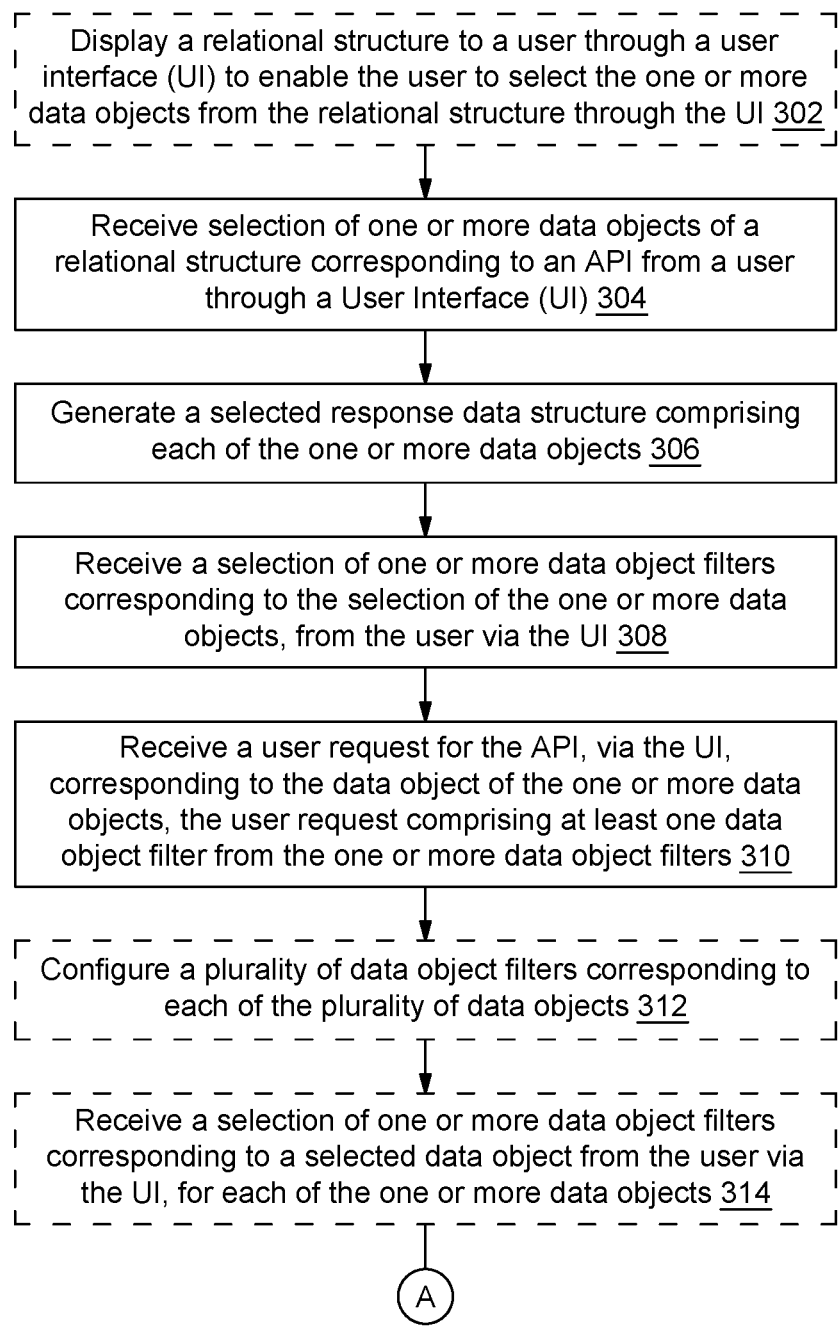
FIGS. 3A-3B is a flow diagram of a method for defining, designing and modelling APIs (API requests and API responses), in accordance with some embodiments of the present disclosure.
Figure 3B:
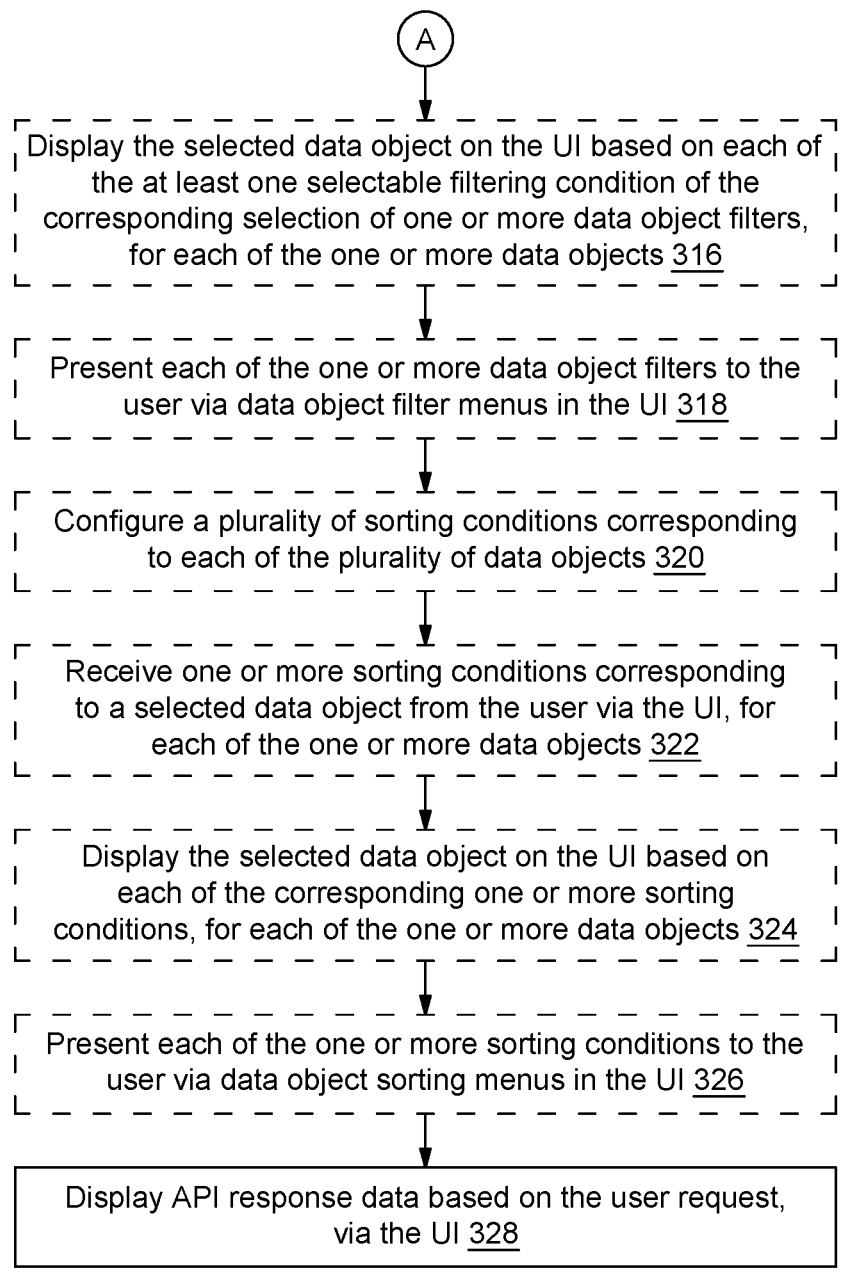

Referring now to FIGS. 3A-3B, a method 300 for designing and developing APIs is depicted via a flow chart, in accordance with some embodiments of the present disclosure. The method 300 should be read and understood in conjunction with the FIGS. 1-2, and include at least one or more of the embodiments of the system described in the FIGS. 1-2. Further, the method 300 may or may not follow a step flow as described by steps 302-334 in the flowchart 300 in FIGS. 3A-3B. In an embodiment, the method 300 may be implemented by the API designing device 102 of the system 100.

The method 300 may include displaying a relational structure to a user through a UI (such as, the UI 202) to enable the user to select the one or more data objects from the relational structure through the UI, at step 302. The relational structure may include a plurality of selectable data objects. Further, the method 300 may include receiving selection of one or more data objects of a relational structure corresponding to an API from a user through the UI, at step 304. In an embodiment, the method 300 may include annotating a data object from the selection of one or more data objects as a root node entity and displaying the relational structure to the user through the UI based on the root node entity. The relational structure may be anchored to the root node entity. In an embodiment, the relational structure may be a hierarchical relational structure anchored to the root node entity. It may be noted that the hierarchical relational structure may be one of a tree-like structure and a graph relational structure. Further, the method 300 may include generating a selected response data structure including each of the one or more data objects, at step 306.

Further, the method 300 may include receiving a selection of one or more data object filters corresponding to the selection of the one or more data objects, from the user via the UI, at step 308. Each of the one or more data object filters may correspond to one of an API request or an API response. Each of the one or more data object filters may include at least one selectable filtering condition (such as, a basic filtering condition or an advanced filtering condition) associated with a data object of the one or more data objects. Further, the method 300 may include receiving a user request for the API, via the UI, corresponding to the data object of the one or more data objects, the user request including at least one data object filter from the one or more data object filters, at step 310. By way of an example, the UI 202 may display a relational structure to a user to enable the user to select the one or more data objects from the relational structure. Further, the response data selection module 204 may receive selection of one or more data objects of a relational structure corresponding to an API from the user through the UI 202. Further, the response data selection module 204 sends the selection of one or more data objects to the selected response structure module 206. The selected response structure module 206 may generate a selected response data structure including each of the selection of one or more data objects.

Further, the method 300 may include configuring a plurality of data object filters corresponding to each of the plurality of data objects, at step 312. Further, the method 300 may include receiving a selection of one or more data object filters corresponding to a selected data object from the user via the UI, for each of the one or more data objects, at step 314. Further, the method 300 may include displaying the selected data object on the UI based on each of the at least one selectable filtering condition of the corresponding selection of one or more data object filters, for each of the one or more data objects, at step 316. Further, the method 300 may include presenting each of the one or more data object filters to the user via data object filter menus in the UI, at step 318. Further, the method 300 may include configuring a plurality of sorting conditions corresponding to each of the plurality of data objects, at step 320. Further, the method 300 may include receiving one or more sorting conditions corresponding to a selected data object from the user via the UI, for each of the one or more data objects, at step 322. Further, the method 300 may include displaying the selected data object on the UI based on each of the corresponding one or more sorting conditions, for each of the one or more data objects, at step 324. Further, the method 300 may include presenting each of the one or more sorting conditions to the user via data object sorting menus in the UI, at step 326.

In an embodiment, the user may apply at least one logic operation (for example, AND operator, OR operator, NOT operator, or the like) to the selection of one or more data object filters via the UI. In some embodiments, the method 300 may include receiving a filter code for each of the selection of one or more data object filters corresponding to a selected data object from the user via the UI and displaying the API response data, via the UI, based on the filter code of each of the at least one selectable filtering condition of the corresponding selection of one or more data object filters.

Further, the method 300 may include displaying API response data based on the user request, via the UI, at step 328. The API response data may correspond to the data object in accordance with the at least one data object filter. In continuation of the example above, the selected response structure module 206 may send the selected response data structure to the request filter definition module 208, the response filter definition module 212 and the response sort definition module 210. Each of the request filter definition module 208 and the response filter definition module 212 may receive a selection of one or more data object filters corresponding to the selection of one or more data objects, from the user via the UI 202. Each of the selection of one or more data object filters sent to the request filter definition module 208 corresponds to one of an API request and each of the selection of one or more data object filters sent to the response filter definition module 212 corresponds to an API response. Each of the selection of one or more data object filters includes at least one selectable filtering condition associated with a data object.

Further, the request filter definition module 208 and the response filter definition module 212 may display the selected data object on the UI 202 based on each of the at least one selectable filtering condition of the corresponding selection of one or more data object filters. The response sort definition module 210 may receive one or more sorting conditions corresponding to a selected data object from the user via the UI 202. Further, the response sort definition module 210 may display the selected data object on the UI 202 based on each of the corresponding one or more sorting conditions. Further, the API designing device 102 may display the designed API 214 based on outputs of the request filter definition module 208, the response filter definition module 212, and the response sort definition module 210.

FIGS. 4-10 illustrate interactive visual UIs for designing and modelling a structured definition of APIs (API Responses), in accordance with some embodiments of the present disclosure. The interactive visual UIs as shown in the FIGS. 4-10 may be understood and may function as the UI 202 of the system 100 and 200, as explained in the FIGS. 1, 2, and 3A-3B above. It should be understood that the present disclosure may not restrict to the present design of UIs as shown in the FIGS. 4-10 and other designs of UIs for defining, designing, and modelling APIs may be implemented, without deviating from the meaning and scope of the present disclosure. Also, the UIs as shown in the FIGS. 4-10 are explained by taking an exemplary situation of a medical domain. It should be understood that the present disclosure does not restrict to this exemplary situation of a medical domain and may be equally applicable for different domains, without deviating from the meaning and scope of the present disclosure.

Figure 4:
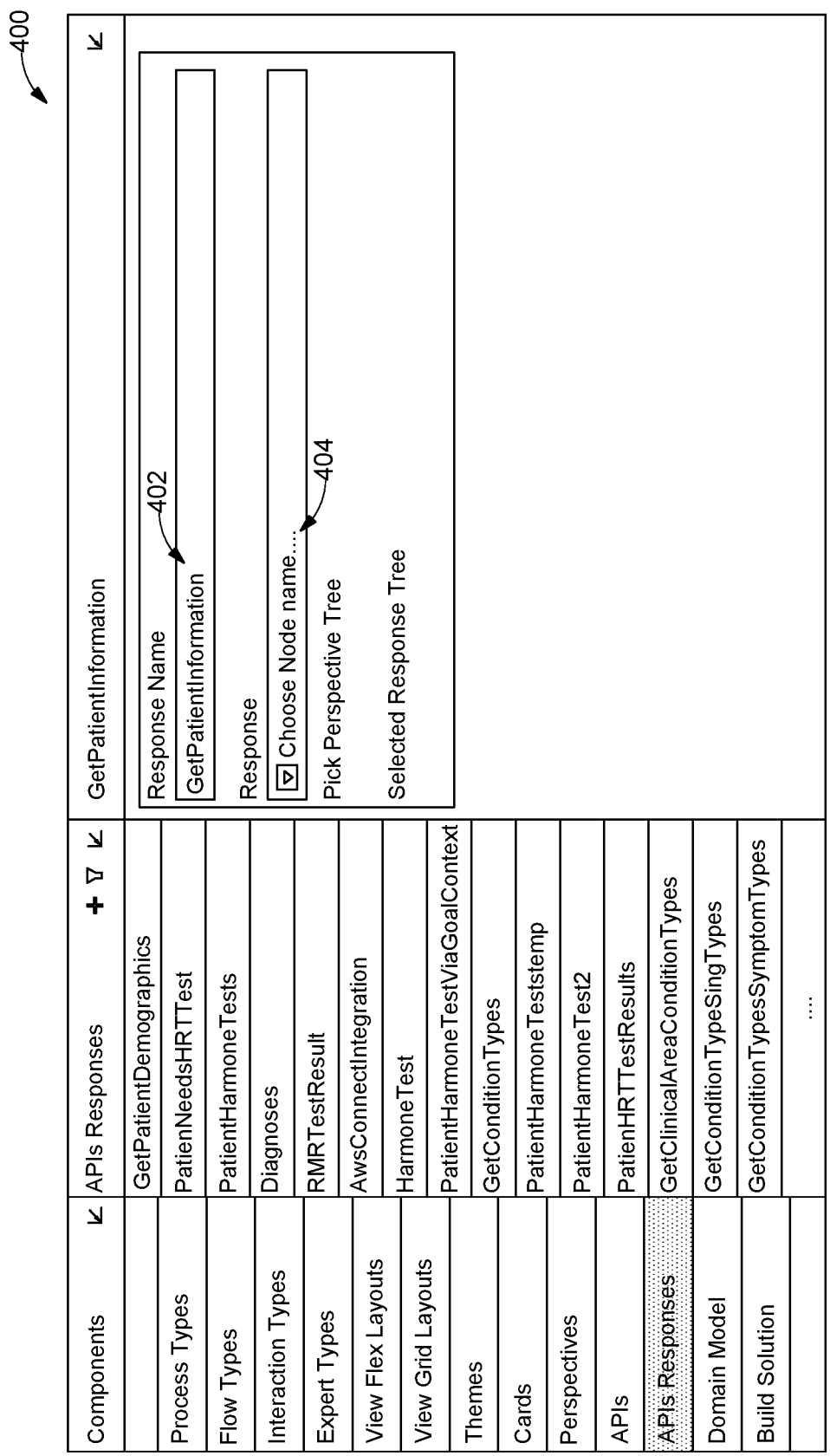
FIGS. 4-10 illustrate interactive visual User Interfaces (UIs) for defining, designing and modelling APIs (API Responses), in accordance with some embodiments of the present disclosure.

In an embodiment as shown in the FIG. 4, a visual UI 400 may be implemented to initiate a process of defining, designing and modelling APIs definitions (API requests and API responses). A user, such as a developer, may easily interact with the UI 400 to define attributes/objects/their properties, individually or in combination and design them for an API Response. API Response may generally be defined to configure responses for APIs to read and fetch from a database. At the UI 400, the user may provide a name to an API Response using a tab 402, for example "GetPatientInformation" or "GetPatientDemographicInformation" as shown at the UI 400 in the FIGS. 4 and 5.

As discussed above, the present disclosure may be implemented to design APIs definitions to support relational data models for relational databases, such as, graph-based relational data models for graph-based relational databases. Additionally, the present disclosure may be implemented to design APIs to support other types of relational data models, such as tabular format, for relational databases, other than graph-based, in some embodiments. The user may select a root node, which may be a data entity, for designing the API. The root node may be an entity at which the structural definition of the API would be centrally connected, and for which related information would be needed to configure while designing and structuring the API, for the API to eventually read any information related to the root node. The root node, selected here, may be any data entity present in the relational data model, at which the user wishes to anchor the configuration and design of the API, and then may spread across the relational data model to choosing related data objects including data entities/relationships etc., for example selecting a second level, a third level data entities/relationships, and so on, for the root node entity.

Figure 5:
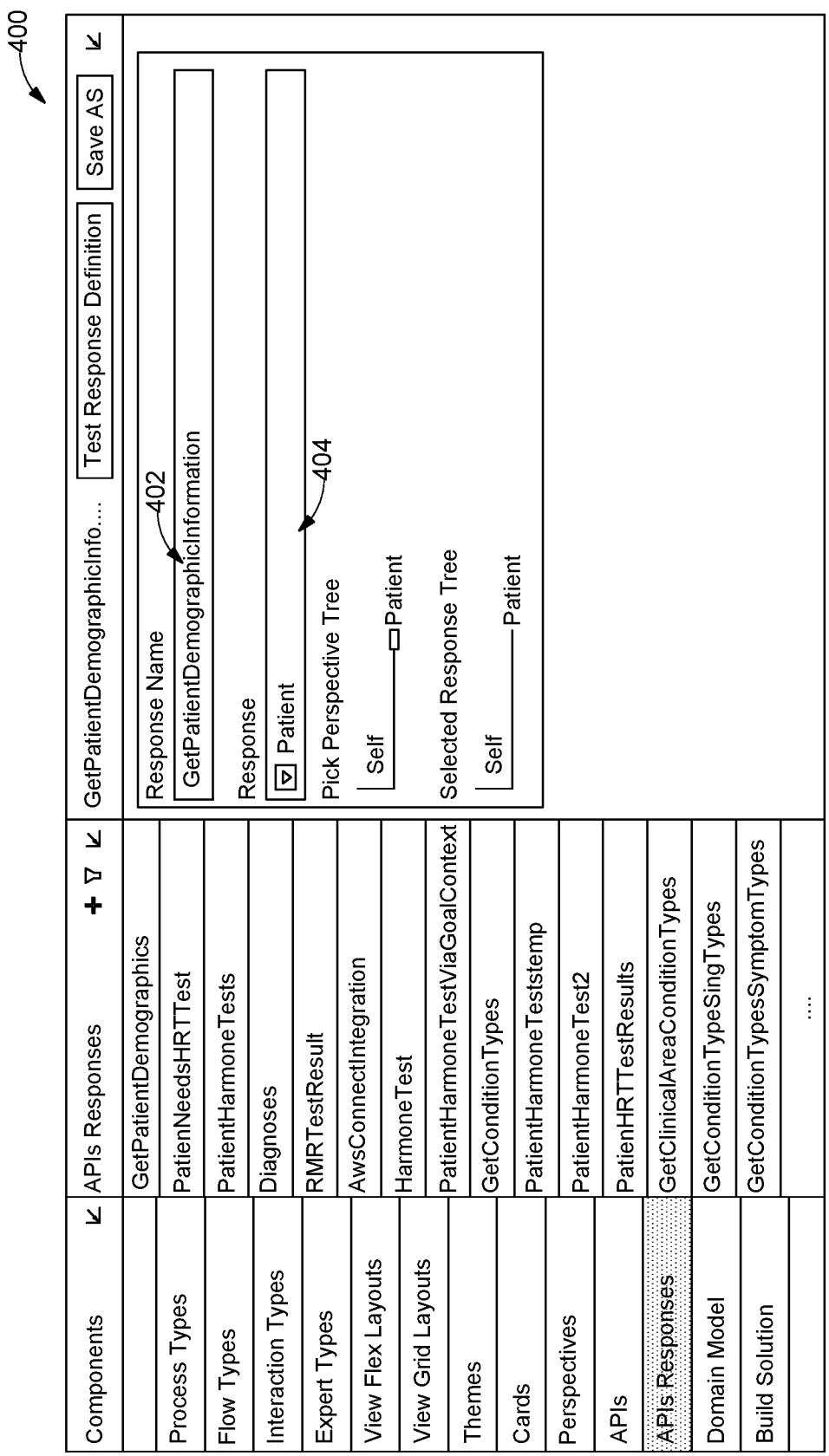

Thus, as an example shown at the UI 400 in the FIGS. 4 and 5, the user may select, via a tab 404, a root node named "patient" for the API Response. Every data entity present in the relational data model can be selected via this tab 404.

Further, the UI 400 may present a visual relational structure that may show and represent the data objects as they are related in the relational data model. The visual relational structure may be a hierarchical relational structure, such as tree-like structure or a graph relational structure. In the present exemplary FIGS. 4-10, the hierarchical relational structure is embodied in the form of tree-like structure. Thus, the user may interact with the UI 400 and visualize a tree-like relational structure which is anchored to the root node that the user has previously selected. This tree-like relational structure may be expandable and selectable to select, via the UI 400, any number of data objects (including entities, relationships and their attributes) related to the root node entity.

So, as soon as the user selects a root node, such as "patient", a perspective tree-like relational structure 406 may be shown to the user which is anchored to the root node data entity "patient", as can be seen in FIG. 5. In an embodiment, the relational structure may also be embodied as graph-like view or database view (will be shown in following figures), other than tree-like view.

The tree-like relational structure 406 may include and show all the data objects (including any hierarchical level of data entities, relationships and their attributes) related to the root node entity in a relational structure as they are stored in the relational database, for the user to simply click and choose. By doing this, the selected entities and its information is configured in designing the API response.

Figure 6:
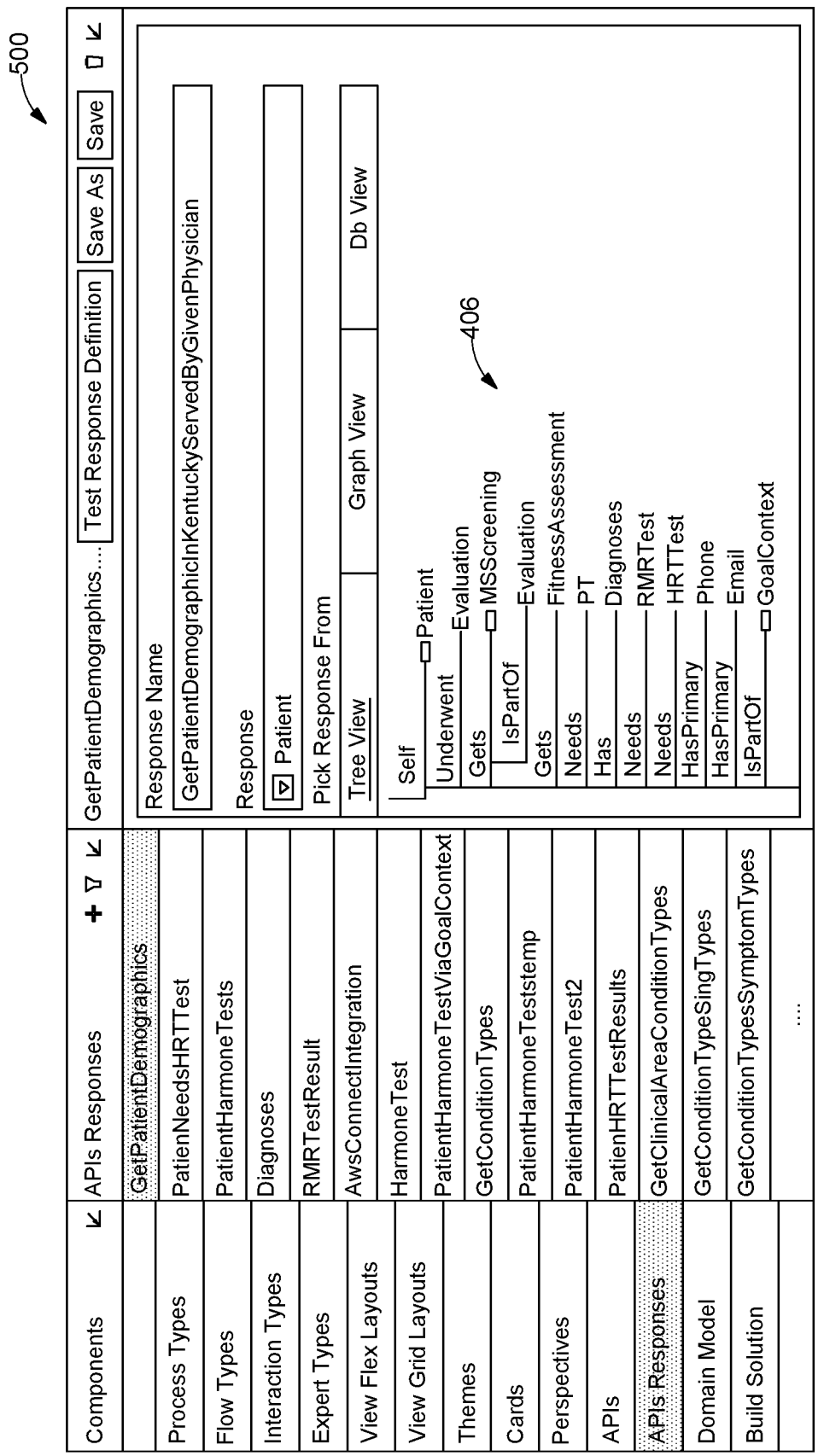

This tree-like relational structure 406 for entity "patient" may be expanded, as shown via a UI 500 in the FIG. 6, to view data objects (e.g. including any hierarchical level of data entities, relationships and their attributes) related to the root node entity, "patient". The user may interact with the UI 400 or 500 to view the tree-like relational structure 406 related to the entity "patient", may select and expand it and then, may simply select any desired number of data objects (e.g. including any hierarchical level of data entities, relationships and their attributes, individually or in combination) which are needed to be configured for designing a defined structure for the API Response for e.g. for the API Response "GetPatientDemographicInformation".

Figure 7:
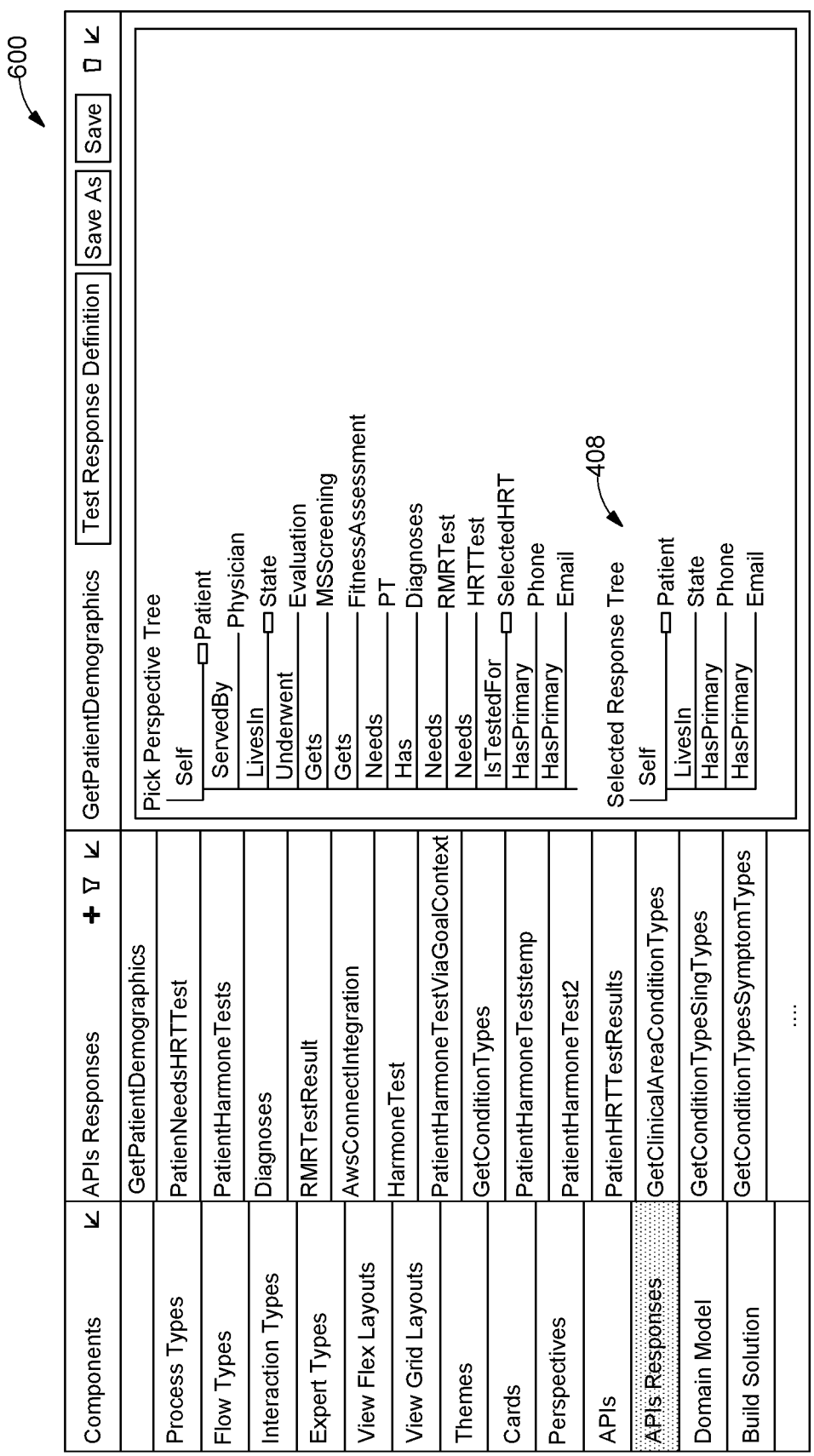

Therefore, the user may select, via a UI 600 as shown in the FIG. 7, one or more data objects from the expanded tree-like relational structure 406 related to the entity "patient". As and when the user is selecting the data objects, the UI 600 may also show a "selected response tree" 408, which may include and show all the selected data objects selected from the tree-like relational structure 406. Additionally, the user may also deselect the selected data objects, via the UI 600, in order to delete it from the selected response tree 408.

Figure 8:
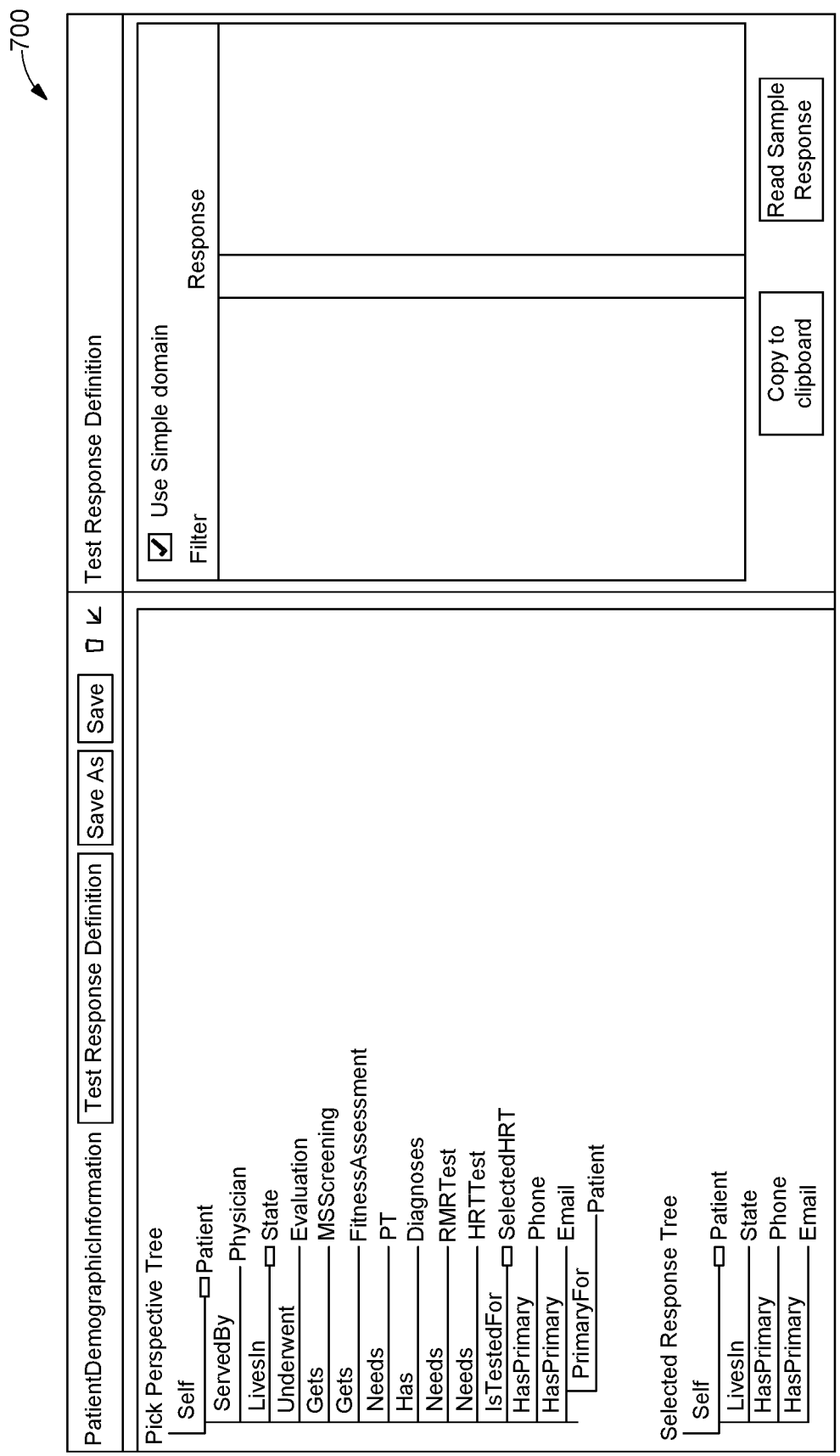

Further, the user may save the "selected response tree" 408, as shown in a UI 700 in FIG. 8, which may save all the selected data objects in the response tree 408 as the data objects being configured in definition of the API Response. Thereafter, the user may also test a configured and saved API Response definition, via the UI 700 as shown in the FIG. 9. Results from the test run that are presented in the Response column are validated by the developer to ensure they meet their expected data output. "Use Sample Domain" flag is used to target the test run against data in the Sample Domain or data in the Real Production Domain's. Further, a UI 800 in the FIG. 10, shows a configured API Response definition which is also tested by the user, as saved. Hence, the API Response definition named "GetPatientDemographicInformation" may be created and saved, implementing the UIs 400-800 as shown in the FIGS. 4-10 above.

Thus, following the FIGS. 4-10, any API Response may be defined by simply clicking, selecting and deselecting required root node data entity, its related data entities and data relationships, and their corresponding attributes, visually from a relational structure, such as the hierarchical tree-like or a graph-like structure, as shown in the visual UIs 400-800.

While designing a definition of an API including defining API Response and API request structure, the present system also may provide a process for designing APIs where filtering conditions and sorting conditions to be applied on a data result set read by a requested API may also be defined. Thus, the defined API with such filtering conditions and sorting conditions may only read and fetch a subset from a requested API data result set.

Hence, the present system may also provide a set of UIs functioning along with the API designing device 102 to further define and configure a response which may be read by an API by defining filtering and sorting conditions for the response. So, such kind of response filtering may read and fetch only subset of a data result set of the API Request, by further applying a filtering mechanism over basic and/or advance request filters defined for the API (as will be shown in the FIGS. 14-17 below). Thereby, further constraining and reducing the size of the data result set which would be read and fetched by the API. Such filtering conditions over the response of an API may be referred to as 'response filters'.

Figure 11:
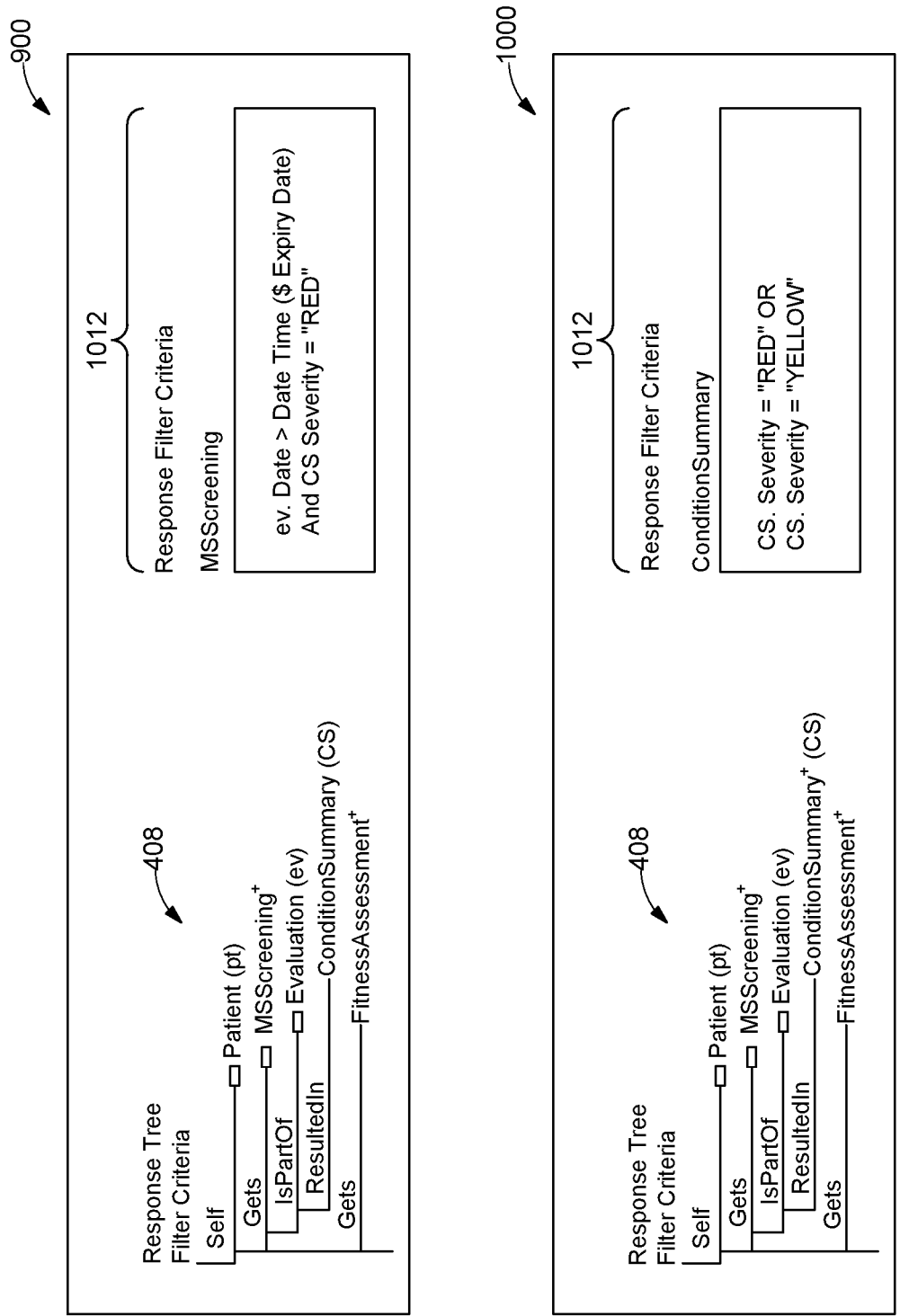
FIGS. 11-12 illustrate interactive visual UIs for defining response filters and sorting conditions for an API Response, in accordance with some embodiments of the present disclosure.
Figure 12:
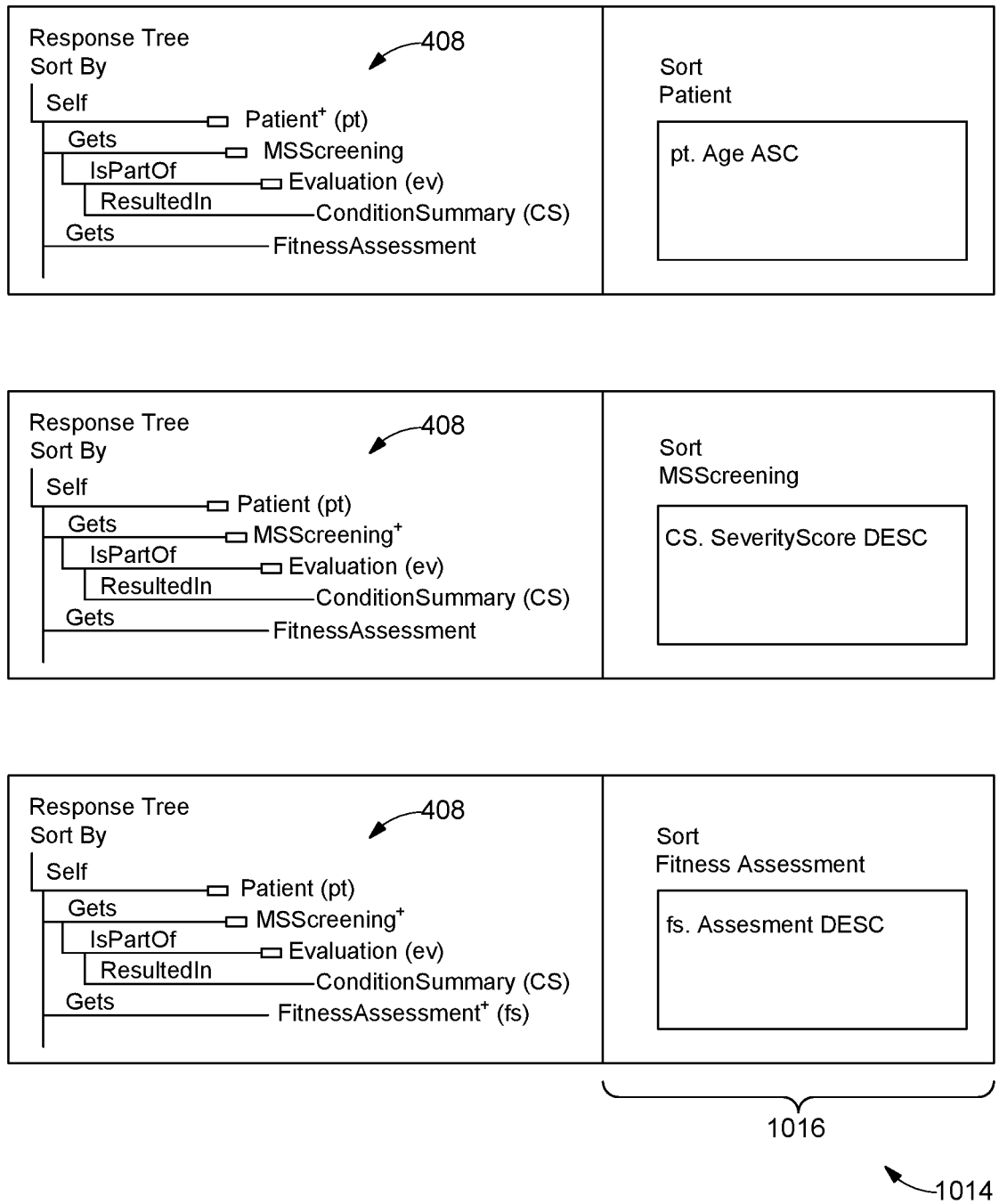

FIGS. 11-12 illustrate interactive visual UIs for defining response filters and sorting conditions for an API, in accordance with some embodiments of the present disclosure. The interactive visual UIs as shown in the FIGS. 11-12 may be understood and may function as the UI 202 of the system 100 and 200, as explained in the FIGS. 1, 2, and 3A-3B above. It should be understood that the present disclosure may not restrict to the present design of UIs as shown in the FIGS. 11-12 and other designs of UIs for defining, designing and modelling APIs may be implemented, without deviating from the meaning and scope of the present disclosure. Also, the UIs as shown in the FIGS. 11-12 are explained by taking an exemplary situation of a medical domain. It should be understood that the present disclosure does not restrict to this exemplary situation of a medical domain and may be equally applicable for different domains, without deviating from the meaning and scope of the present disclosure.

Response filters for the response of an API may be defined for any selected data entity, selected data information or their relationships, and/or their related attributes and/or their basic and advance request filters which may be defined while defining the APIs (API Request). By defining and applying such response filters, an API may fetch only a filtered specific data result set from the read and called data result set, further reducing the size of the data. Additionally, the present system may also provide for defining sorting conditions for the filtered specific data result set, which may be fetched after the response filters. The sorting conditions may define a sorting order for the filtered specific data result set, in which it may be fetched and shown to a user.

For defining the response filters, the present system may provide visual UIs 900-1000 that may further provide a filter defining interface 1012 to view, select or define the response filters by navigating through the filter defining interface 1012. The filter defining interface 1012 may be embodied in a form including and not limited to one or more filter menus, where the filter menus define a number of response filters for the data objects and their relationships. In an embodiment, the filter menus may be embodied in the form of drop-down menus. It may be apparent to a person skilled in the art that the filter defining interface 1012 may be presented at the UI in other forms, such as a fill-in tab, a search tab, dialogue box, including others for showing the filtering conditions associated with a data object or a data relationship, without deviating from the meaning and scope of the present disclosure.

Referring to FIG. 11, a set of exemplary UIs (900, 1000 and 1012) may be implemented by the API designing device 102 to define the response filters for configuring definitions of the response of the APIs. The UI 900-1000 may show the response tree 408, which is earlier created in the above FIGS. 4-10. All the data objects selected and added in the response tree 408 may be displayed, via the UI 900-1000, to the user. The user may interact with the UI 900-1000 and may select any one of the data objects, at a time, from the response tree 408 to further define the response filters for the particular selected data object.

For example, as shown at the UI 900, the user may select, via the UI 900, a data entity "MS Screening" from the response tree 408 and may further define, via the UI 1012, one or more response filters such as "severity=RED" for the selected data entity "MS Screening". Further, as shown at the UI 1000, the user may select, via the UI 1000, a data entity "evaluation" from the response tree 408 and may further define, via the UI 1012, one or more response filters such as "evaluation date≥"Date time"", for the selected data entity "evaluation". The value for "Date time" in the "evaluation date" may be provided by the user, such as Feb. 1, 2019.

Also, in an embodiment, the API designing device 102 may apply one or more logical operators such as including and not limited to "AND", "OR", "NOT" between the defined one or more response filters for the one or more data objects in the response tree 408. In a default situation, the API designing device 102 may apply the logical operator "AND", between the defined one or more response filters for the one or more data objects in the response tree 408.

Thus, by defining such response filters, this particular API may read and fetch in the response only those patients' data information who have "MS Screening" labelled as "RED" in the database, or those "MS Screening" data information for the patient which have "MS Screening" labelled as "RED", and furthermore filtering and reading only those "RED" "MS Screening" data information which have the evaluation date Feb. 1, 2019 in the database, in this particular example.

Similarly, the user may define one or more response filters for the one or more data objects in the response tree 408.

In the processes for designing APIs, as much as defining filters (basic, advance request filters or response filters) for data objects (including data entities, relationships and their attributes) may be required, defining of sorting conditions for the data result set may also be required, in an embodiment. Thus, the present system and the API designing device 102 may allow a user to define one or more sorting conditions which may be applied while reading a filtered specific data result set by an API. Applying sorting conditions, may instruct the APIs to sort the filtered specific data result set in a given sorting order while presenting the filtered specific data result set to the user.

Referring to FIG. 12 an exemplary UI (1014) may be implemented by the API designing device 102 to define the sorting conditions or sorting order for sorting the filtered specific data result in a response of an API. The UI 1014 may further provide a sorting order defining interface 1016 to view, select or define the sorting conditions by navigating through the sorting order defining interface 1016. The sorting order defining interface 1016 may include but may not be limited to one or more sorting menus, where the sorting menus define a number of sorting conditions for the data objects and their relationships in a filtered specific data result set. In an embodiment, the sorting menus may be embodied in the form of drop-down menus. It may be apparent to a person skilled in the art that the sorting order defining interface 1016 may be presented at the UI in other forms, such as a fill-in tab (including a user command for the sorting conditions), a search tab, dialogue box, including others for showing the sorting conditions associated with a data object or a data relationship, without deviating from the meaning and scope of the present disclosure.

The UI 1014 may show the response tree 408. All the data objects selected and added in the response tree 408 may be displayed, via the UI 1014, to the user. The user may interact with the UI 1014 and may select any one of the data objects, at a time, from the response tree 408 to further define the sorting conditions or sorting order for the particular selected data object.

For example, as shown at the UI 1014, the user may select, via the UI 1014, a data entity "patient" from the response tree 408 and may further define, via the UI 1016, a sorting order such as "Pt. Age ASC" for an attribute "age" of the selected data entity "patient". Further, as shown at the UI 1014, the user may select, via the UI 1014, a data entity "MS Screening" from the response tree 408 and may further define, via the UI 1016, a sorting order such as "DESC" for an attribute "severity score" of the selected data entity "MS Screening".

Also, in an embodiment, the API designing device 102 may apply one or more logical operators such as including and not limited to "AND", "OR", "NOT" between the defined sorting conditions for the data objects in the response tree 408. In a default situation, the API designing device 102 may apply the logical operator "AND", between the defined sorting conditions for the data objects in the response tree 408.

Thus, by defining such sorting conditions, this particular API may sort the read and fetched data result for the entity "patient" in "ASCENDING" order of patients' ages and may sort the read and fetched data result for the entity "MS Screening" in "DESCENDING" order of severity score of MS Screening reports, in the response of the API, in this particular example.

Similarly, the user may define one or more sorting conditions for the one or more data objects in the response tree 408.

Further, in an embodiment of the present disclosure, the present system may include a default situation where while selecting a data object via the UI 202 for defining the APIs, all the attributes related to the selected data object may be selected and included in designing the APIs. Hence, by default all the attributes of the selected data object may be read by the designed API. In such default situations, the UI 202 may allow the user to de-select some of the attributes for excluding them from being configured in the definition of the API.

Additionally, in an embodiment of the present disclosure, the UI 202 may allow keeping some of the attributes of the data objects secured. By defining them as secured, the APIs may not read the secured attributes. This may be helpful in cases when by default all the attributes are selected to be read by the API, unless these attributes are explicitly selected from the relational structure to be secured, via the UI 202.

One such exemplary situation is shown in the FIG. 13. Referring to FIG. 13, the user may select, via a UI 1018, one or more attributes of a selected data object, such only the attributes "first name" and "last name" of the selected data entity "patient" to be read by the API, while also selecting the attributes "SSN" and "DOB" of the selected data entity "patient" to be secured attributes 410 and not read by the API.

Figure 9:
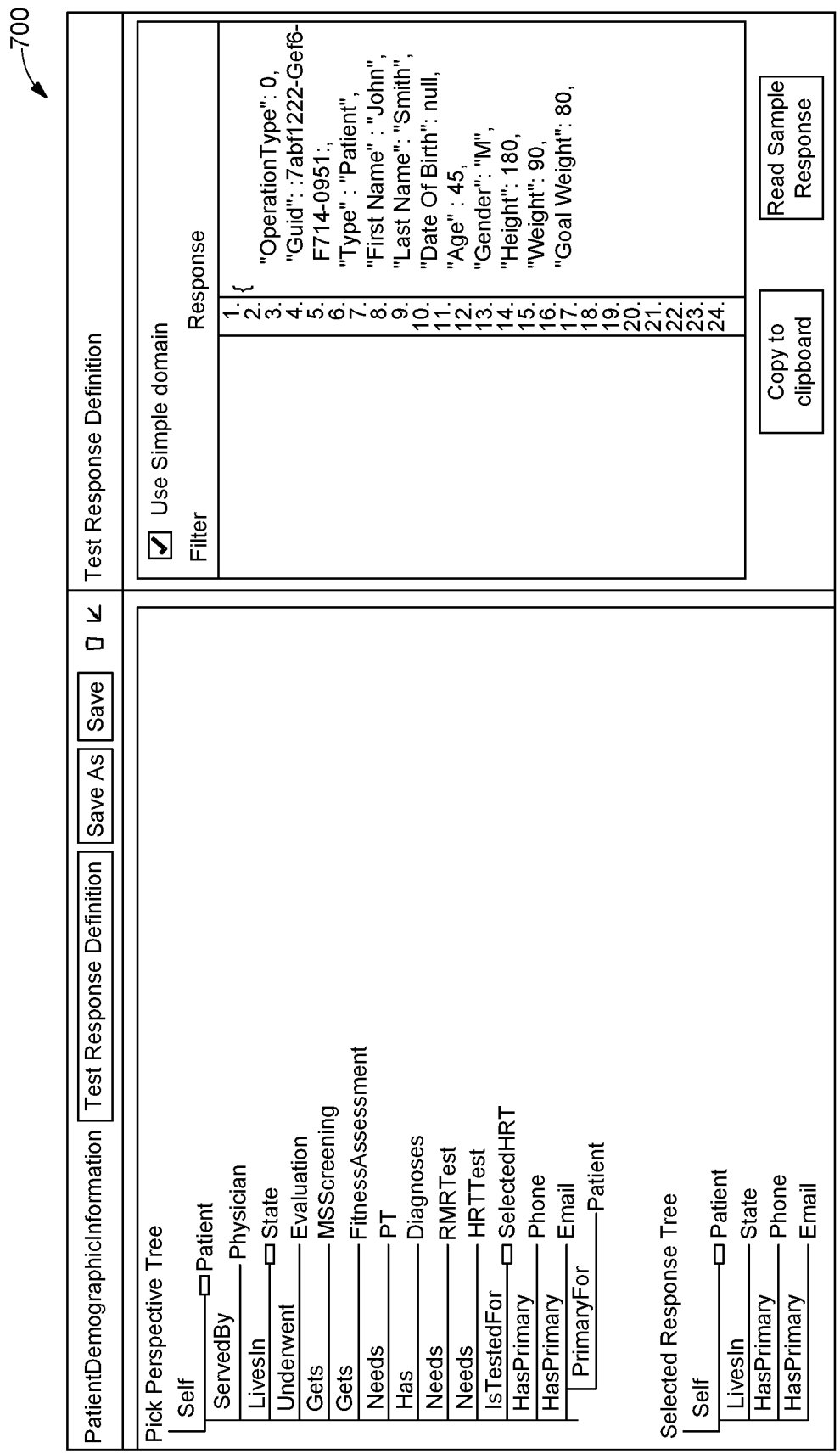
Figure 10:
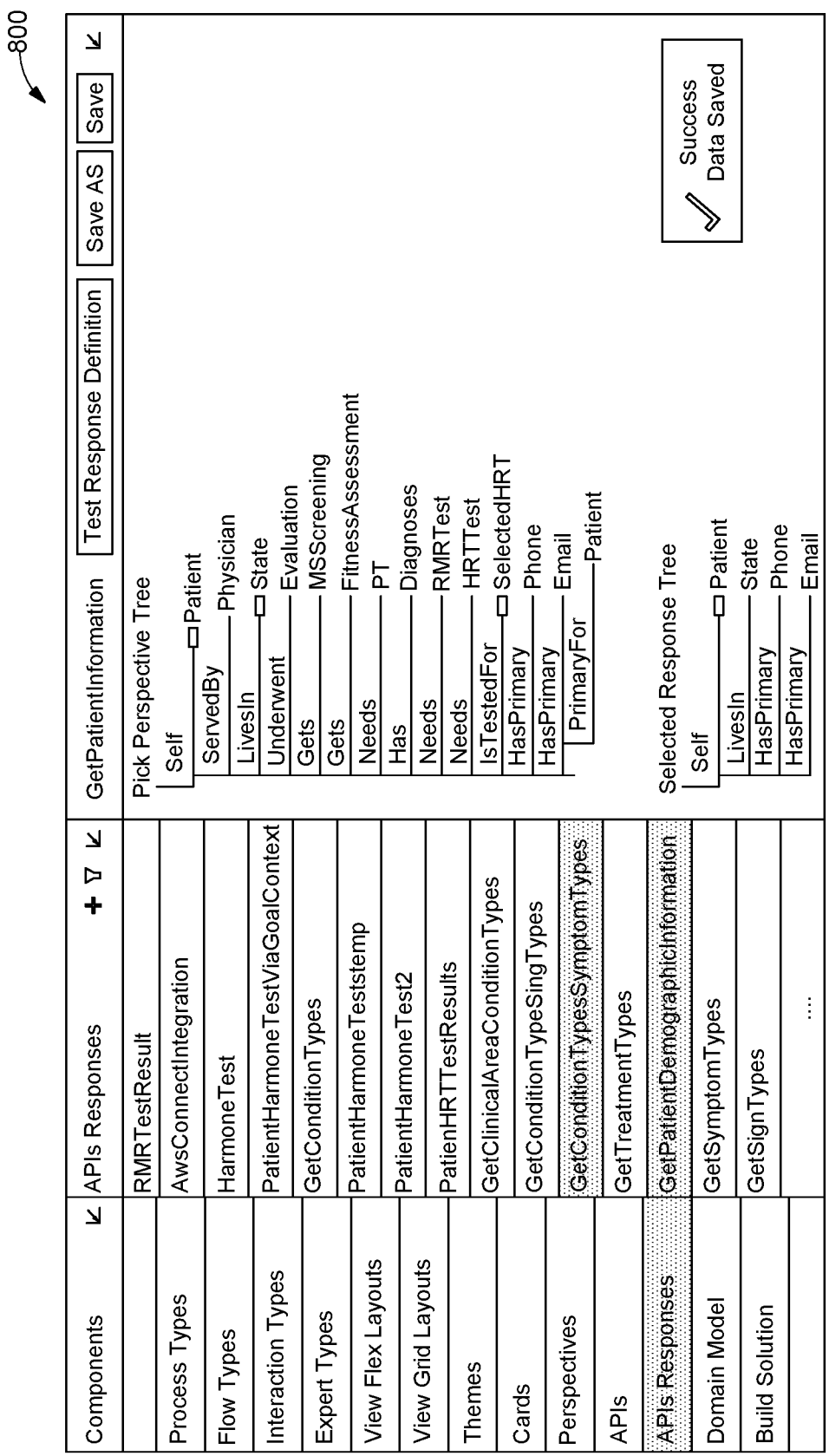

The API Definition to this point (Combined definition of Response Definition, Response Filter & Sort Definition) can be tested using Sample or Real Data similar to the way Response Definition alone is tested in the FIG. 9.

FIGS. 14-17 illustrate interactive visual UIs for designing and modelling definitions of APIs (API requests), in accordance with some embodiments of the present disclosure. The interactive visual UIs as shown in the FIGS. 14-17 may be understood and may function as the UI 202 of the system 100 and 200, as explained in the FIGS. 1, 2, and 3A-3B above. It should be understood that the present disclosure may not restrict to the present design of UIs as shown in the FIGS. 14-17 and other designs of UIs for defining, designing and modelling APIs may be implemented, without deviating from the meaning and scope of the present disclosure. Also, the UIs as shown in the FIGS. 14-17 are explained by taking an exemplary situation of a medical domain. It should be understood that the present disclosure does not restrict to this exemplary situation of a medical domain and may be equally applicable for different domains, without deviating from the meaning and scope of the present disclosure.

In an embodiment as shown in the FIG. 14, a visual UI 1020 may be implemented to initiate a process of defining, designing and modelling APIs definitions (API Requests). A user, such as a developer, may easily interact with the UI 1020 to define attributes/objects/their properties, individually or in combination and design them for an API Request. API Request may generally be configured to define an API which may include configuring required data objects and required filters for the data objects in order for the APIs to read a particular filtered data result set from a database. At the UI 1020, the user may provide a name to an API (or API Request) using a tab 1022, for example "GetPatientInformationForPatientInAGivenState" as shown at the UI 1020 in the FIG. 14. To configure this API, a filter "InAGivenState" may need to be defined and applied over the earlier designed API Response "GetPatientDemographicInformation". It may be understood that these examples are only meant for understanding the present disclosure, and the present disclosure may not be restricted, in any situation, to these examples.

Figure 15:
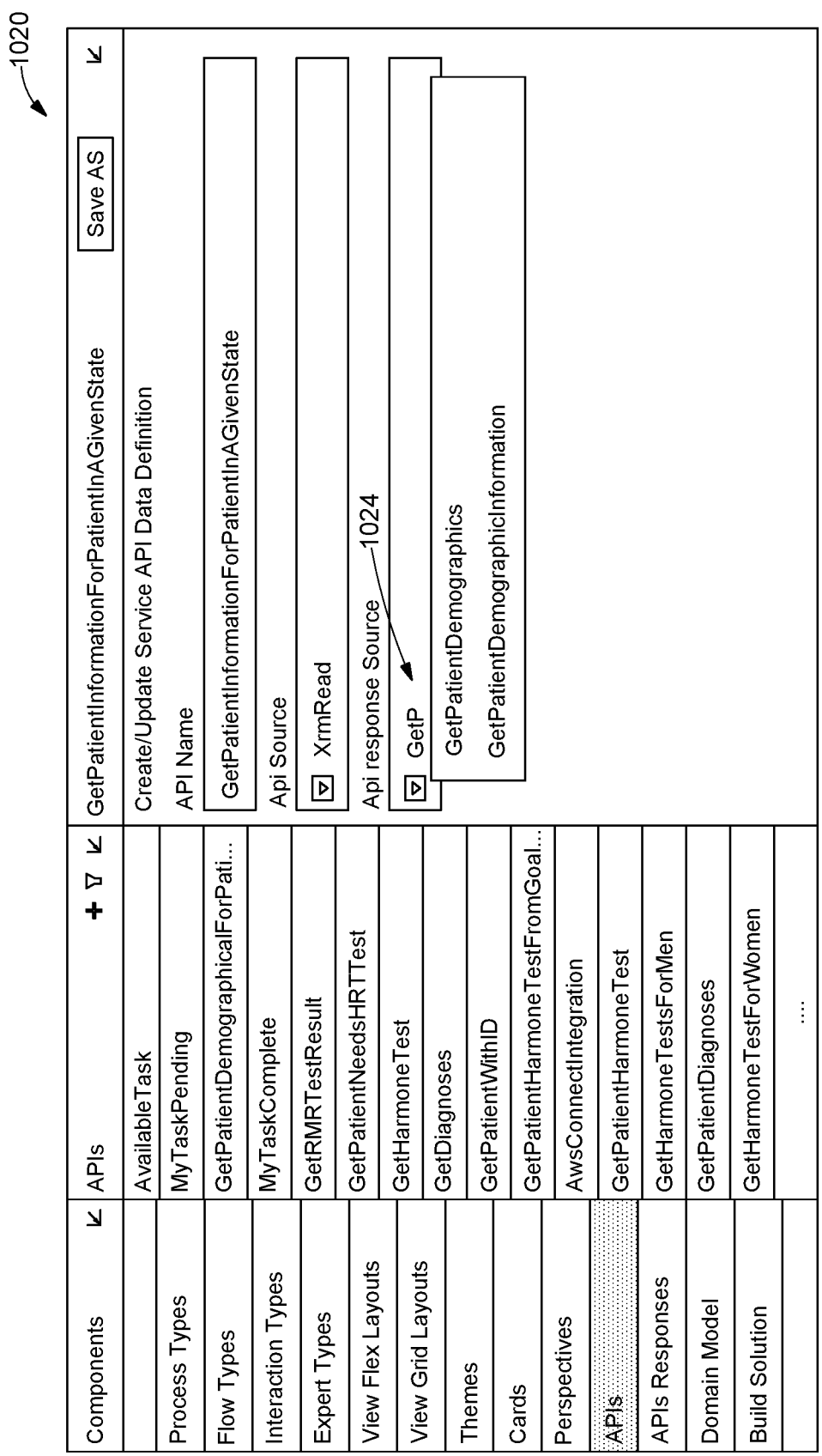
Figure 17:
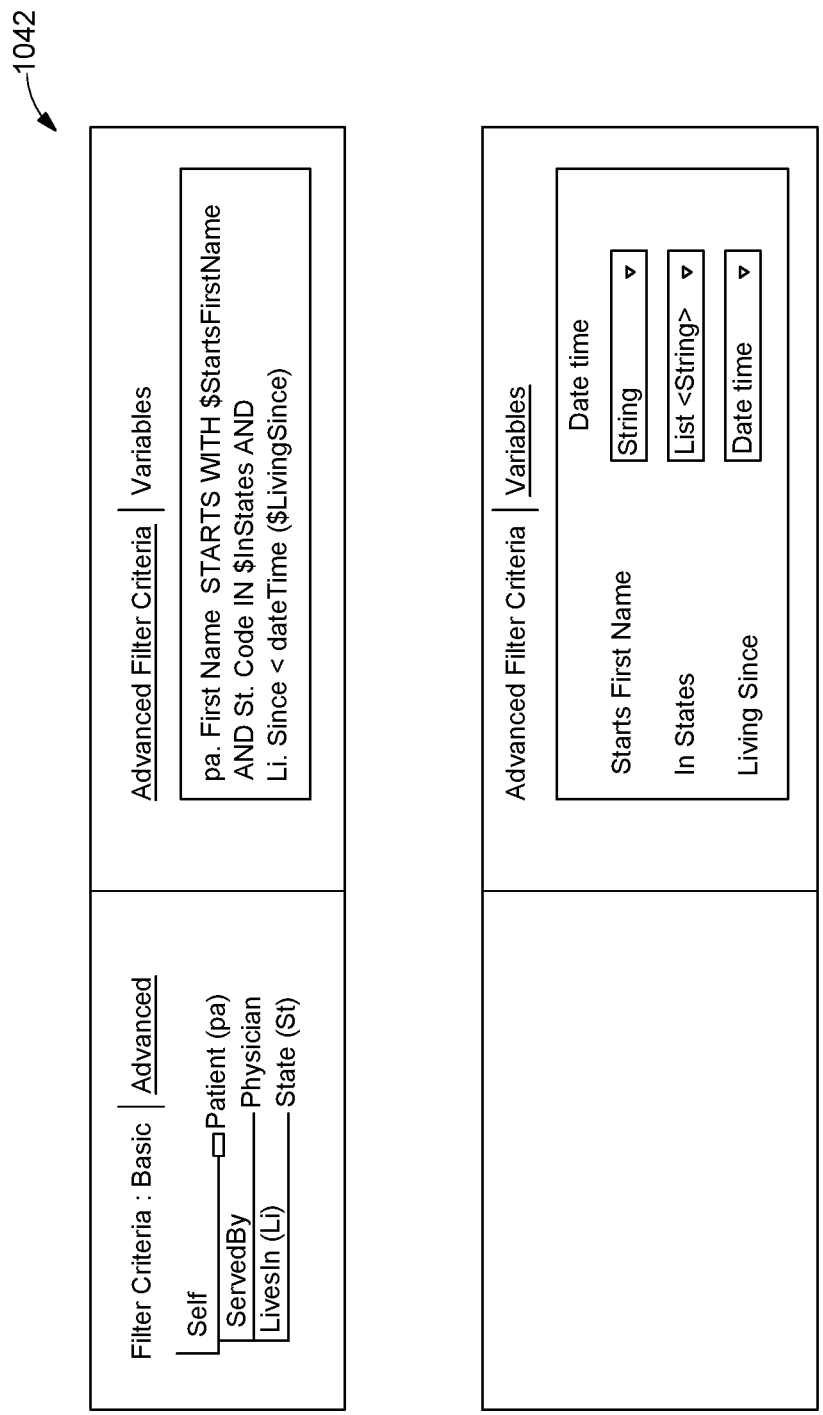

Thereafter, the user may select, via the UI 1020, an API response source using a tab 1024. The tab 1024, at the UI 1020 as shown in FIG. 15, may show a number of already created API Responses to the user (as created above in the FIGS. 4-10), from which the user may select the one which is required to create the API. In this example, the user may select, via the UI 1020 in the FIG. 15, the API Response "GetPatientDemographicInformation", which was created above in the FIGS. 4-10 using the UIs 400-800.

For designing a particularly defined and structured API, one or more filters for the data objects, that define the structure of the particular API, may need to be defined too while API designing process. The present disclosure may provide a process of creating and defining an API including a simple and automatic process of defining and configuring necessary data objects along with the necessary filters associated with the data objects, in the structured definition of the API, using the UIs as shown in the present FIGs.

The process may include simply selecting/deselecting, via the UIs as shown in the present FIGs., necessary data objects from a relational structure. The relational structure may include a tree-like relational structure that may easily allow the user to select/deselect the necessary data objects for which filters needed to be defined. Hence, the data objects and their filters may be included or excluded into/from the defined structure of the APIs by simply selecting/deselecting them respectively. After selecting the necessary data objects, the process may include simply selecting/deselecting, via the UIs as shown in the present FIGs., the necessary filters to be further defined and associated with the selected data objects for structuring the definition of the API.

For each selected data object, one or more filters, configured via the UI, may apply specific filtering mechanism on the selected data object. For example, while defining a particular API Request "GetPatientDemographicsInKentuckyServedByGivenPhysician", a filter "GivenPhysician" in this particular API needs to be defined. Hence, a user may define a basic request filter on a selected data entity i.e. "physician", and the basic request filter can be "license ID". Thus, while defining the particular API, a user needs to enter a particular license ID, which acts as a request filter on the selected data entity i.e. "physician". Therefore, a basic request filer may be created and defined for "GivenPhysician" in the API "GetPatientDemographicsInKentuckyServedByGivenPhysician".

In an embodiment, basic request filters and advanced request filters, individually or in combination may be defined for each selected data entity to structure the definition of the API (API Request).

In the present exemplary embodiment, after selecting the API Response "GetPatientDemographicInformation" in the FIG. 15, a UI 1026 (functioning together with the API designing device 102) may present a relational structure 1028 to the user for the user to pick one or more required data objects, from the relational structure 1028, over which request filters need to be defined. The relational structure 1028 may include and show data objects related to the root node entity (e.g. "patient" here) as they are related in the relational data model supporting the database. The visual relational structure may be a hierarchical relational structure, such as tree-like structure, or a graph relational structure. The relational structure 1028 may include and show those data objects related to the root node entity, e.g. "patient" in the relational data model, which may be required to define a particular API (API Request).

The user may select, via the UI 1026, one or more data objects, from the relational structure 1028, for which one or more request filters may need to be configured. The request filters for the data objects may define one or more filtering conditions to be associated with the data objects in the API Request definition.

As and when one or more data objects from the relational structure 1028 are selected for configuring request filters, the UI 1026 may, thus, show a request tree 1030 that may include and show a hierarchical tree-like relational structure of the selected data objects (may include entities and relationships), selected from the relational structure 1028. The request tree 1030 may include the selected data objects for which one or more request filters are needed to be configured. As can be seen in the FIG. 16, the user has selected entities "patient", "physician" and "state", from the relational structure 1028, that needs to be primarily defined in order to structure a particular API "GetPatientDemographicsInKentuckyServedByGivenPhysician".

As the entities are being selected from the relational structure 1028, a request tree 1030 is created and shown, via the UI 1026 in the FIG. 16. Thereafter, the user may select, via the UI 1026, any one data object, at a time, from the request tree 1030 to define one or more request filters for the selected data object. The UI 1026 may also provide a request filter defining interface (such as UI 1032, 1034, and 1036) which may be implemented to view, select or define the request filters or request filtering conditions by navigating through the request filter defining interface (UI 1032, 1034 and 1036). The request filter defining interface (UI 1032, 1034, and 1036) may be including and not limited to one or more request filter menus, where the request filter menus define a number of request filtering conditions for the data objects and their relationships. In an embodiment, the request filter menus may be embodied in the form of drop-down menus. It may be apparent to a person skilled in the art that the request filter defining interface (UI 1032, 1034, and 1036) may be presented at the UI in other forms, such as a fill-in tab, a search tab, dialogue box, including others for showing the request filtering conditions associated with a data object or a data relationship, without deviating from the meaning and scope of the present disclosure.

The user may select, via the UI (1032, 1034, 1036), one or more request filters for the selected data object from request filter menus 1038. Additionally, while choosing and/or adding one or more request filters from the request filter menus 1038, the UI 1026 (functioning together with the API designing device 102) may also apply and show one or more logical operators 1040 that may be implemented to be applied on the selected request filters for their structured configuration. For example, logical operators 1040 may include and is not limited to equals to, greater than, less than, in null and the like. Also, after defining the request filters for the data objects in the request tree 1030, the UI 1026 (functioning together with the API designing device 102) may apply one or more Boolean logical operations, such as "AND" or "OR" or "NOT", between the configured request filters associated with each data object and the data objects in the request tree 1030 in order to define a data result set which would be read and fetched by the API from the database.

For example, as shown in the request filter defining interface 1032 of the UI 1026, the entity "physician" may be selected from the request tree 1030, and one or more request filters, such as "License ID", "gender", "super-specialization", "practising time", and others, may be added, selected and defined, from the request filter menus 1038, for the entity "physician". Similarly, as shown in the request filter defining interface 1034 of the UI 1026, a second entity "state" may be selected from the request tree 1030, and one or more request filters, such as "are code", and others, may be added, selected and defined, from the request filter menus 1038, for the entity "state". Likewise, the user may simply select, via the UI 1026, any one data object, at a time, from the request tree 1030 to define one or more request filters for the selected data object, by simply selecting, via the UI (1032, 1034, 1036) and from the filter menus 1038, one or more request filters.

Further, the present system may also allow defining request filters for data relationships along with the data entities. Thus, the UI 1026 may also show and allow the user to define request filters for data relationships by simply selecting one or more request filters to be configured. For example, as shown in the request filter defining interface 1036 of the UI 1026, request filters for a data relationship "Lives In", between data entity "patient" and "state", may be defined. Thus, a user may simply select and configure, via the UI 1026 and from the filter menus 1038, a request filter "since" for the data relationship "Lives In", and may also select the logical operator 1040, e.g. "less than", for defining the filter "since" for the data relationship "Lives In". Thus, when information may be filled in this filter "since", such as "5 years", and when this request filter is applied on the data relationship "lives In", the API may read only the data of patients who are living in a particular area "since" "5 years".

Therefore, the present system, by implementing the UIs 1020-1036 in the FIGS. 14-16, may allow to define and configure request filters for the data objects, that includes data entities and data relationships as well, in order to define the API, by simply selecting/deselecting request filters from a selectable relational structure, such as a tree-like structure, in combination with informative menus, such as filter menus 1038.

Furthermore, the present system, by implementing the UIs 1020-1026 in the FIGS. 14-17, may allow to define and configure basic and advance level request filters for the data objects, according to an embodiment. UI 1026 as shown in the FIG. 16 may be implemented to define and configure basic request filters for the data objects. While, UI 1042 shown in the FIG. 17 may be implemented to define and configure advanced request filters for the data objects. In defining advance request filters, the data objects may need to be aliased (for example: in Patient (pa), "pa" is an alias for Patient in the FIG. 17) in order to unambiguously refer to them in the filter definition. Variables (for example: $StartsFirstName in the FIG. 17) may be used in the filter definition to provide a way for setting the actual filter criteria at run time. Data Types for variables are also defined to ensure the values provided at the run time match the Filter's needs (for example: StartsFirstName is defined to be String Data Type in FIG. 17). In the present system, the API designing device 102 may merge the basic request filtering logic with the advanced request filtering logic, and may provide very complex request filtering mechanisms for providing the data result set.

The API Definition to this point (Combined definition of Response Definition (as shown in conjunction with FIGS. 4-10), Response Filter & Sort Definition (as shown in conjunction with FIGS. 11-12) and Request Filter Definition (as shown in conjunction with FIGS. 14-17)) can be tested using Sample or Real Data similar to the way Response Definition alone is tested in the FIG. 9.

Hence, the present system, by implementing the UIs 400-1042 as shown in the FIGS. 4-17, may not require the user to manually write or define a structure of APIs because the user may simply select/deselect and configure the data objects and their associated filters for configuring definitions of the APIs.

Thus, following the FIGS. 4-17, and implementing the UIs 400-1042, the present system may allow a user to easily and quickly define and configure data attributes, such as including data entities, data relationships and their properties, for configuring a structured definition of an API in a simple select and configure manner.

In an embodiment of the present disclosure, the system (100, 200) and the related method 300 for defining and configuration of APIs, including defining and configuration the API response and the API request, via the UIs (202, 400-1042) may also be executed by skipping one or more steps from the whole process, as shown and described in the FIGS. 4-16. For example, the system and the method may skip steps of separately naming an API Request and mentioning a related API Response source, as shown in the FIGS. 14 and 15, and may directly jump to configuring API Request data objects and configuring request filters for the data objects in the request tree 1030 (FIG. 16), after defining and configuring response filters and sorting order for the data objects in the response tree 408 (FIGS. 11, 12 and 13). Thus, the system and the method are not restricted to the defined process flow as explained in the FIGS. 4-17.

Figure 18:
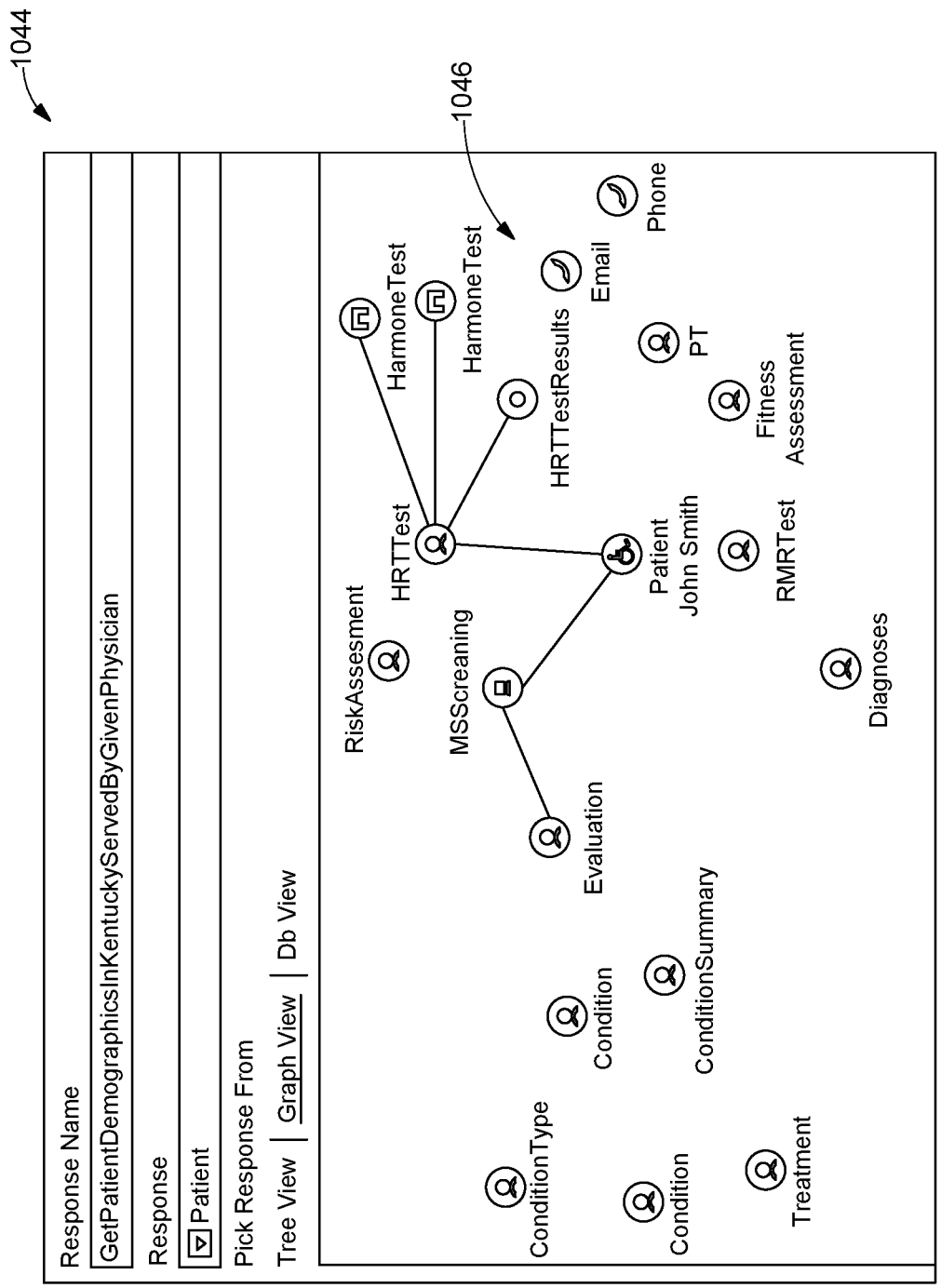
FIG. 18 illustrates a visual UI to visualize a graph-based relational structure of data objects, in accordance with some embodiments of the present disclosure.

Now, referring to FIG. 18, according to an embodiment, a visual UI 1044 may be implemented to visualize a graph-based relational structure 1046 that may show and define the data objects as they are related in the relational data model. As the tree-like relational structure (e.g. 406) is implemented by the present system (e.g. in FIGS. 4-17 above) for simply selecting or deselecting and configuring data objects in defining an API, similarly graph-based relational structure 1046 may be implemented, via the UI 1044, by the present system to define and configure a definition of the API. The graph-based relational structure 1046 may directly map to a graph-based relational data model supporting a database. The user may directly walk through the graph-based relational structure 1046 at the UI 1044 for directly selecting and/or deselecting the data objects to define APIs.

Figure 19:
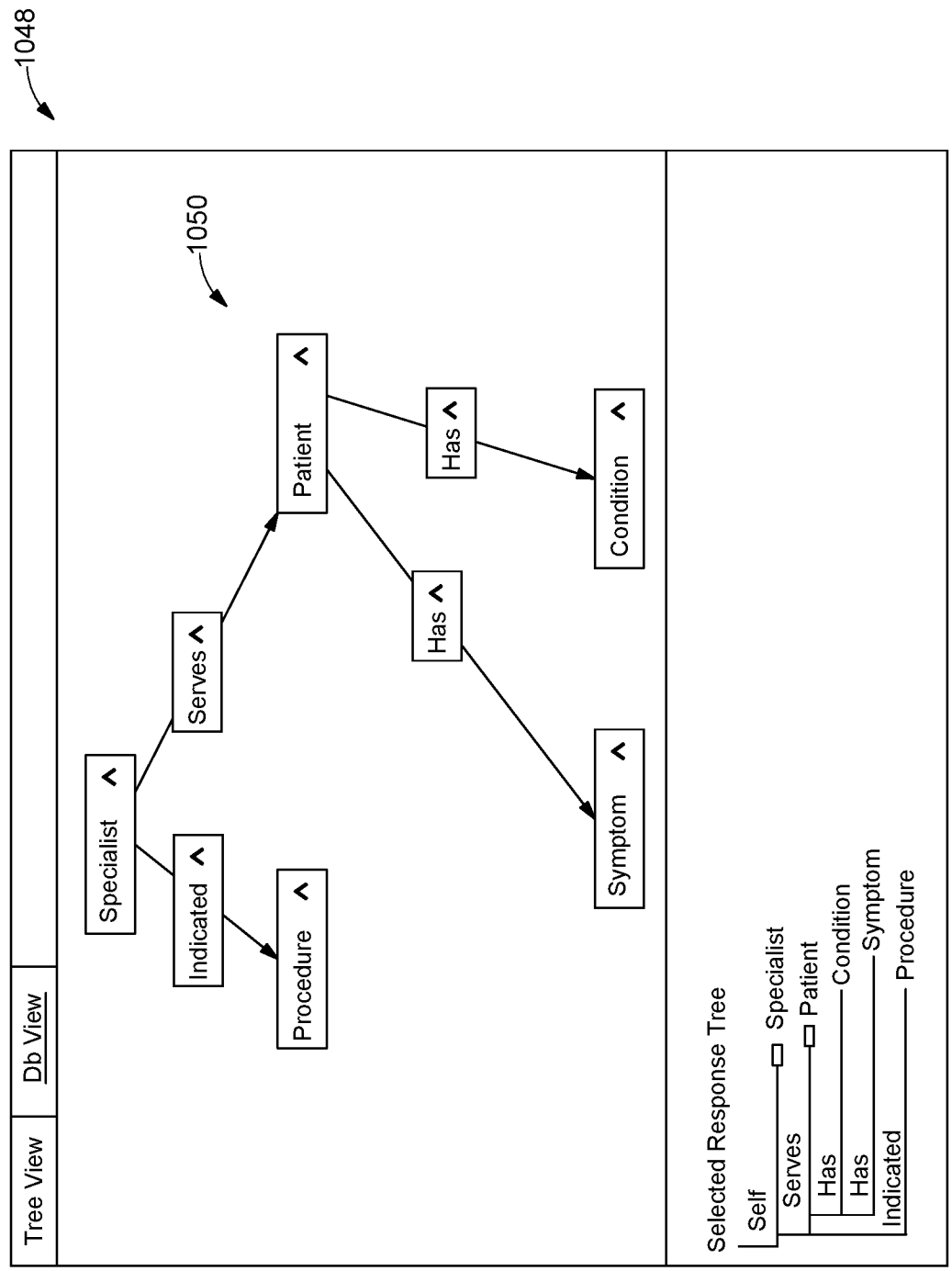
FIG. 19 illustrates a visual UI to visualize a relational structure embodied as database structure in accordance with some embodiments of the present disclosure.

Referring to FIG. 19, according to an embodiment, a visual UI 1048 may be implemented to visualize a relational structure 1050 embodied as database structure, that may show and define the data objects as they are related in the relational data model. As the tree-like relational structure (e.g. 406) is implemented by the present system (e.g. in FIGS. 4-17 above) for simply selecting or deselecting and configuring data objects in designing an API, similarly relational structure 1050 may be implemented, via the UI 1048, by the present system to configure a definition of the API. The relational structure 1050 may be mapping exactly to the relational data model supporting a database. The user may directly walk through the relational structure 1050 at the UI 1048 for directly selecting and/or deselecting the data objects to define APIs.

Advantageously, the present system and the method may have the ability to develop APIs in fraction of the time and cost as compared to what it takes to develop normally, from scratch. The present system and the method may provide better quality, ways for easy to change design and configuration of the APIs (visually change and retest, via the visual UIs (400-1022)), better performance.

Importantly, the present system may have the ability to bring forward any subset of data information from the database without having to manually write and define the APIs because the present system may provide visual UIs that may allow to visualize and simply select one or more data objects and configure them along with their properties, one or more filtering conditions and one or more sorting conditions for configuring the APIs, and thus no need to manually define these data objects for the APIs.

Additionally, the present system may provide the visual UIs that may be implemented to visually test run the configured APIs.

It is intended that the disclosure and examples be considered as exemplary only. Though the present disclosure includes examples from medical art or situations, the system and method disclosed herein may be employed for various businesses as would be appreciated by one skilled in the art.

What is claimed is:

1. A method for designing and developing Application Programming Interface (API), the method comprising:
  receiving, by an API designing device, selection of one or more data objects of a relational structure corresponding to an API from a user through a User Interface (UI), wherein the relational structure comprises a plurality of selectable data objects;
  generating, by the API designing device, a selected response data structure comprising each of the one or more data objects;
  receiving, by the API designing device, a selection of one or more data object filters corresponding to the selection of the one or more data objects, from the user via the UI, wherein each of the one or more data object filters corresponds to one of an API request or an API response, and wherein each of the one or more data object filters comprises at least one selectable filtering condition associated with a data object of the one or more data objects;
  receiving, by the API designing device, a user request for the API, via the UI, corresponding to the data object of the one or more data objects, wherein the user request comprises at least one data object filter from the one or more data object filters; and
  displaying, by the API designing device, API response data based on the user request, via the UI, wherein the API response data corresponds to the data object in accordance with the at least one data object filter.

2. The method of claim 1, further comprising:
  displaying the relational structure to the user through the UI to enable the user to select the one or more data objects from the relational structure through the UI.

3. The method of claim 1, further comprising:
  annotating a data object from the selection of one or more data objects as a root node entity; and
  displaying the relational structure to the user through the UI based on the root node entity, wherein the relational structure is anchored to the root node entity.

4. The method of claim 3, wherein:
  the relational structure is a hierarchical relational structure anchored to the root node entity, and
  the hierarchical relational structure is one of a tree-like structure and a graph relational structure.

5. The method of claim 1, further comprising:
configuring a plurality of sorting conditions corresponding to each of the plurality of data objects; and
for each of the one or more data objects,
receiving one or more sorting conditions corresponding to a selected data object from the user via the UI; and
displaying the selected data object on the UI based on each of the corresponding one or more sorting conditions.

6. The method of claim 5, further comprising presenting each of the one or more sorting conditions to the user via data object sorting menus in the UI.

7. The method of claim 1, further comprising:
configuring a plurality of data object filters corresponding to each of the plurality of data objects; and
for each of the one or more data objects,
receiving a selection of one or more data object filters corresponding to a selected data object from the user via the UI; and
displaying the selected data object on the UI based on each of the at least one selectable filtering condition of the corresponding selection of one or more data object filters.

8. The method of claim 7, further comprising presenting each of the one or more data object filters to the user via data object filter menus in the UI.

9. The method of claim 1, further comprising applying, by the user, at least one logic operation to the one or more data object filters via the UI.

10. The method of claim 1, further comprising:
receiving a filter code for each of the one or more data object filters corresponding to a selected data object from the user via the UI; and
displaying the API response data, via the UI, based on the filter code of each of the at least one selectable filtering condition of the corresponding selection of the one or more data object filters.

11. A system for designing and developing Application Programming Interface (API), the system comprising:
a processor; and
a memory communicatively coupled to the processor, wherein the memory stores processor-executable instructions, which, on execution, cause the processor to:
receive selection of one or more data objects of a relational structure corresponding to an API from a user through a User Interface (UI), wherein the relational structure comprises a plurality of selectable data objects;
generate a selected response data structure comprising each of the one or more data objects;
receive a selection of one or more data object filters corresponding to the selection of the one or more data objects, from the user via the UI, wherein each of the one or more data object filters corresponds to one of an API request or an API response, and wherein each of the one or more data object filters comprises at least one selectable filtering condition associated with a data object of the one or more data objects;
receive a user request for the API, via the UI, corresponding to the data object of the one or more data objects, wherein the user request comprises at least one data object filter from the one or more data object filters; and display API response data based on the user request, via the UI, wherein the API response data corresponds to the data object in accordance with the at least one data object filter.

12. The system of claim 11, wherein the processor-executable instructions further cause the processor to:
display the relational structure to the user through the UI to enable the user to select the one or more data objects from the relational structure through the UI.

13. The system of claim 11, wherein the processor-executable instructions further cause the processor to:
annotate a data object from the selection of one or more data objects as a root node entity; and
display the relational structure to the user through the UI based on the root node entity, wherein the relational structure is anchored to the root node entity.

14. The system of claim 13, wherein:
the relational structure is a hierarchical relational structure anchored to the root node entity, and
the hierarchical relational structure is one of a tree-like structure and a graph relational structure.

15. The system of claim 11, further wherein the processor-executable instructions further cause the processor to:
configure a plurality of sorting conditions corresponding to each of the plurality of data objects; and
for each of the one or more data objects,
receive one or more sorting conditions corresponding to a selected data object from the user via the UI; and
display the selected data object on the UI based on each of the corresponding one or more sorting conditions.

16. The system of claim 15, wherein the processor-executable instructions further cause the processor to present each of the one or more sorting conditions to the user via data object sorting menus in the UI.

17. The system of claim 11, wherein the processor-executable instructions further cause the processor to:
configure a plurality of data object filters corresponding to each of the plurality of data objects; and
for each of the one or more data objects,
receive a selection of one or more data object filters corresponding to a selected data object from the user via the UI; and
display the selected data object on the UI based on each of the at least one selectable filtering condition of the corresponding selection of one or more data object filters.

18. The system of claim 17, wherein the processor-executable instructions further cause the processor to present each of the one or more data object filters to the user via data object filter menus in the UI.

19. The system of claim 11, wherein the processor-executable instructions further cause the processor to:
receive a filter code for each of the one or more data object filters corresponding to a selected data object from the user via the UI; and
display the API response data, via the UI, based on the filter code of each of the at least one selectable filtering condition of the corresponding selection of the one or more data object filters.

20. A non-transitory computer-readable medium storing computer-executable instructions for designing and developing Application Programming Interface (API), the computer-executable instructions configured for:
receiving selection of one or more data objects of a relational structure corresponding to an API from a user through a User Interface (UI), wherein the relational structure comprises a plurality of selectable data objects;

generating a selected response data structure comprising each of the one or more data objects;

receiving a selection of one or more data object filters corresponding to the selection of the one or more data objects, from the user via the UI, wherein each of the one or more data object filters corresponds to one of an API request or an API response, and wherein each of the one or more data object filters comprises at least one selectable filtering condition associated with a data object of the one or more data objects;

receiving a user request for the API, via the UI, corresponding to the data object of the one or more data objects, wherein the user request comprises at least one data object filter from the one or more data object filters; and displaying API response data based on the user request, via the UI, wherein the API response data corresponds to the data object in accordance with the at least one data object filter.

* * * * *